US012680267B2

(12) United States Patent
Fukuda et al.

(10) Patent No.: US 12,680,267 B2
(45) Date of Patent: Jul. 14, 2026

(54) ATTACHMENT MANAGEMENT SYSTEM FOR MANAGING ATTACHMENT INFORMATION UNIQUE TO ATTACHMENT COUPLED TO WORK VEHICLE

(71) Applicant: Kubota Corporation, Osaka (JP)

(72) Inventors: Yuji Fukuda, Sakai (JP); Tomoyuki Noguchi, Sakai (JP); Daichi Kino, Sakai (JP); Shotaro Kubota, Sakai (JP); Ryuki Matsumoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 50 days.

(21) Appl. No.: 18/817,475

(22) Filed: Aug. 28, 2024

(65) Prior Publication Data

US 2026/0062887 A1 Mar. 5, 2026

(51) Int. Cl.
| | |
|---|---|
| *E02F 3/96* | (2006.01) |
| *E02F 9/24* | (2006.01) |
| *E02F 9/26* | (2006.01) |
| *G06K 19/07* | (2006.01) |
| *H04B 5/77* | (2024.01) |

(52) U.S. Cl.
CPC .............. *E02F 3/968* (2013.01); *E02F 9/24* (2013.01); *E02F 9/26* (2013.01); *H04B 5/77* (2024.01); *G06K 19/0723* (2013.01)

(58) Field of Classification Search
None
See application file for complete search history.

(56) References Cited

U.S. PATENT DOCUMENTS

| | | | |
|---|---|---|---|
| 11,055,599 B2 | 7/2021 | Okamura et al. | |
| 11,100,727 B2 | 8/2021 | Okamura et al. | |
| 11,295,102 B2 * | 4/2022 | Kappers | G06K 7/10861 |
| 2012/0165962 A1 * | 6/2012 | Faivre | G05B 19/106 |
| | | | 700/19 |
| 2017/0039788 A1 * | 2/2017 | Ligeski | H04W 12/06 |
| 2017/0323263 A1 * | 11/2017 | Foster | G06F 3/0482 |
| 2018/0323816 A1 * | 11/2018 | Chaston | H01Q 1/40 |
| 2020/0181878 A1 * | 6/2020 | Mahrenholz | E02F 3/96 |
| 2024/0117608 A1 * | 4/2024 | Shobe | E02F 9/264 |
| 2026/0057205 A1 * | 2/2026 | Schmidt | G06K 19/0723 |

FOREIGN PATENT DOCUMENTS

WO 2024081645 A1 4/2024

* cited by examiner

*Primary Examiner* — James J Lee
*Assistant Examiner* — Melanie G Huber
(74) *Attorney, Agent, or Firm* — Keating & Bennett, LLP

(57) ABSTRACT

An attachment management system includes a work vehicle, an attachment detachably coupled to the work vehicle including a vehicle controller, and a communication tag fixed to the attachment. The communication tag includes a tag transceiver, and a tag memory to store a tag identifier unique to the communication tag and attachment information unique to the attachment, to which the communication tag is fixed. The vehicle controller is configured or programmed to control the vehicle storage to store a new piece of combined information including the tag identifier and attachment information linked thereto in the beacon signal, unless both of the tag identifier and attachment information in the beacon signal match with the tag identifier and attachment information stored in the vehicle storage, and perform a predetermined operation based on attachment information of the new piece of combined information.

40 Claims, 17 Drawing Sheets

34(32)

Tag Transceiver / Tag Memory

| | |
|---|---|
| Tag ID #1 | Attachment Info. #1 |
| Tag ID #2 | Attachment Info. #2 |
| Tag ID #3 (NEW) | Attachment Info. #3 (NEW) |
| Tag ID #4 | Attachment Info. #4 |
| Tag ID #4 | Attachment Info. #104 (Overwritten) |
| Tag ID #104 | Attachment Info. #104 |
| Tag ID #104 (Replaced) | Attachment Info. #4 |
| Tag ID #5 | Attachment Info. #5 |
| Tag ID #105 (Replaced) | Attachment Info. #5 |

24(23)

Beacon Scanner / Vehicle Storage

| | | |
|---|---|---|
| Tag ID #1 | Attachment Info. #1 | Already Stored |
| Tag ID #2 | Attachment Info. #2 | Already Stored |
| Tag ID #3 | Attachment Info. #3 | Newly Stored |
| Tag ID #4 | Attachment Info. #4 | Already Stored |
| Tag ID #4 | Attachment Info. #104 (Overwritten) | Newly Stored |
| Tag ID #104 | Attachment Info. #104 | Already Stored |
| Tag ID #104 (Replaced) | Attachment Info. #4 | Newly Stored |
| Tag ID #5 | Attachment Info. #5 | Already Stored |
| Tag ID #105 | Attachment Info. #5 | Newly Stored |

100

60

52

50

27

1

23

24

30—1
33—1
Attachment 1    Tag
30—2
33—2
Attachment 2    Tag
30—N
33—N
Attachment N    Tag

47

40

42

44

Beacon Signal

| Header | Beacon ID | Attachment Information<br>(including Att. ID, Att. Type, Att. Model, etc.) |
|--------|-----------|----------------------------------------------------------------------------|

Fig.7

PROMPT 1

WARNING!!

Tag ID and/or Attachment Information in received Beacon Signal has not been stored. Attachment Information linked to Tag ID in Beacon Signal is Newly Stored.    OK?

| Tag ID | Att. ID | Att. Type | Att. Model | Spec. |
|--------|---------|-----------|------------|-------|
| #X | #Y | Bucket | AA100 | Maximum Permissible Flow Rate = XXX |

YES          NO

Fig.9

PROMPT 2

WARNING!!

Tag ID and/or Attachment Information in received Beacon Signal has not been stored. Stored Attachment Information linked to Tag ID in Beacon Signal is Newly Stored.    OK?

| Tag ID | Att. ID | Att. Type | Att. Model | Spec. |
|--------|---------|-----------|------------|-------|
| #104 | #4 | Bucket | AA100 | Maximum Permissible Flow Rate = XXX |

YES

NO

PROMPT 3

WARNING!!

No Beacon Signal is Received from Beacon Tag.

Select one piece of Stored Attachment Information among Following Attachment Information.

| Tag ID | Att. ID | Att. Type | Att. Model | Spec. |
|--------|---------|-----------|------------|-------|
| T#3879 | A#4016 | Bucket | AA100 | Maximum Permissible Flow Rate = XXX |
| T#2963 | A#1931 | Bucket | BB200 | Maximum Permissible Flow Rate = YYY |
| T#8432 | A#5033 | Digger | CC300 | Maximum Permissible Flow Rate = ZZZ |

SELECT

Fig.10

Setting Screen

| Tag ID | RSSI | Att. ID |
|--------|------|---------|
| T#8636 | 7 | N/A |
| T#5491 | 7 | N/A |
| T#4051 | 6 | N/A |

PROMPT 4

Caution !!
Some Beacon Signals are Received from Beacon Tags.
Select one piece of Attachment Information
among Following Attachment Information.

| Tag ID | RSSI | Att. ID | Att. Type | Att. Model | Spec. |
|--------|------|---------|-----------|------------|-------|
| T#3879 | 9 | A#4016 | Bucket | AA100 | Maximum Permissible Flow Rate = XXX |
| T#8432 | 8 | A#5033 | Bucket | CC300 | Maximum Permissible Flow Rate = YYY |
| T#2963 | 6 | A#1931 | Digger | BB200 | Maximum Permissible Flow Rate = ZZZ |

SELECT

Fig.12

ATTACHMENT MANAGEMENT SYSTEM FOR MANAGING ATTACHMENT INFORMATION UNIQUE TO ATTACHMENT COUPLED TO WORK VEHICLE

BACKGROUND OF THE INVENTION

1. Field of the Invention

The present invention relates to attachment management systems each capable of managing a plurality of attachments detachably coupled to a work vehicle.

2. Description of the Related Art

The specification of U.S. Pat. No. 11,055,599 discloses a management system of a working machine including a work vehicle and a work device coupled thereto, and in particular, in which a mobile terminal is configured to receive from a RFID (Radio Frequency Identification) tag mounted on the work device, a wireless signal containing a serial number of a RFID tag, and display one serial number corresponding to the work device on registration screen of the mobile terminal. In the management system, the mobile terminal is also configured to receive device information input by a user or the like, which includes specifications, a model name, a model type, a model number, etc., and store device information associated with the serial number of the RFID tag in a memory of the mobile terminal as well as in a server.

The specification of U.S. Pat. No. 11,100,727 discloses a communication system of a working machine including a tractor and a work device attached to the tractor. Specifically, the specification of U.S. Pat. No. 11,100,727 discloses that when a beacon is transmitted from a communication device integrated with the work device, and received by a receiving device of the tractor, a display device of the tractor displays device information, thereby allowing an operator to confirm device information of the work device. The specification also discloses identification information included in device information of the work device is stored in a storage device of the tactor in association with operation information of a device such as an engine of the tractor.

However, the device information stored in the RFID tag may be overwritten depending on the usage environment of the work device on which the RFID tag is fixed. However, the serial number of the RFID tag (tag ID, tag serial number) is never overwritten. The device information includes, for example, identification information (attachment serial number) that identifies device information such as a type and model number of the attachment, and operation information of the work device such as an hour meter (cumulative operating time of the work device) and the supply amount and supply pressure of operation fluid.

Furthermore, when the RFID tag becomes old and is replaced with a new one and attached to the work device, the device information of the old (previously attached) work device may be input to the new RFID tag (new tag ID). In other words, the old device information may be input to the new RFID tag including a new tag ID.

Similarly, the RFID tag attached to one of the work devices may be removed and used for another work device, and the device information of another work device may be input to the RFID tag. In other words, the serial number (tag ID, tag serial number) of the RFID tag remains the same, but different device information may be input to the RFID tag.

In those cases, the device information of the work device linked to the RFID tag serial number (tag ID, tag serial number) stored in the memory of the RFID tag is changed. The combination of the serial number (tag ID, identification information) and the device information stored in the memory of the RFID tag is different or changed from previous one stored in the memory of the RFID tag.

Meanwhile, the work vehicle (tractor) links device information of the specific work device has been attached in the past, to the serial number (tag ID, tag serial number) of the RFID tag, and stores device information in the storage device of the work vehicle. After that, when the work vehicle (tractor) receives the beacon from the communication device integrated into the work device, the work vehicle (tractor) controls the work device using device information of the work device linked to the serial number of the RFID tag previously stored in the storage device of the work vehicle.

However, if the combination of the serial number (tag ID, identification information) and device information stored in the RFID tag memory is different or changed from one used to be stored in the memory of the RFID tag, the work vehicle (tractor) will control the work device using overwritten (changed) device information, which may result in malfunction or failure of the work vehicle and/or the work device.

SUMMARY OF THE INVENTION

An attachment management system according to an example embodiment of the present invention includes a work vehicle including a vehicle storage, a vehicle receiver, and a vehicle controller; an attachment detachably coupled to the work vehicle; and at least one communication tag interchangeably fixed to the attachment, including a tag transceiver to communicate with the vehicle receiver through a beacon signal that is compliant with a near field communication standard, and a tag memory to store a tag identifier unique to the at least one communication tag and attachment information unique to the attachment, to which the at least one communication tag is fixed; wherein the vehicle storage is operable to store at least one piece of combined information including the tag identifier and attachment information linked thereto, the at least one piece of combined information obtained through the beacon signal which the vehicle receiver has received from the tag transceiver of the at least one communication tag, and the vehicle controller is configured or programmed to, when at least either one of the tag identifier and attachment information in the beacon signal which the vehicle receiver is receiving from the tag transceiver, does not match with the tag identifier and attachment information stored in the vehicle storage as the at least one piece of combined information, control the vehicle storage to store a new piece of combined information including the tag identifier and attachment information linked thereto in the beacon signal which the vehicle receiver is receiving from the tag transceiver, and perform a predetermined operation based on attachment information of the new piece of combined information.

The attachment management system may further include a notifier to provide notification, wherein the vehicle controller is configured or programmed to control the notifier to provide an alarm before controlling the vehicle storage to store the new piece of combined information.

The attachment management system may further include a notifier to provide notification, wherein the vehicle controller is configured or programmed to control the notifier to provide an alarm before performing the predetermined operation based on attachment information of the new piece of combined information.

The attachment management system may further include a user interface, wherein the vehicle controller is configured or programmed to, provide on the user interface, a first prompt inquiring about whether to store in the vehicle storage, the tag identifier and attachment information linked thereto in the beacon signal which the vehicle receiver is receiving from the tag transceiver, as the new piece of combined information, before controlling the vehicle storage to store the new piece of combined information, and control the vehicle storage to store the tag identifier and attachment information linked thereto in the beacon signal, as the new piece of combined information, after receiving approval of an operator to the first prompt.

The attachment management system may further include a user interface, wherein the vehicle controller is configured or programmed to, when at least either one of the tag identifier and attachment information in the beacon signal which the vehicle receiver is receiving from the tag transceiver, does not match with the tag identifier and attachment information stored in the vehicle storage as the at least one piece of combined information, provide on the user interface, the tag identifier and attachment information stored in the vehicle storage as the at least one piece of combined information, and a second prompt inquiring about whether to perform the predetermined operation based on the tag identifier and attachment information stored in the vehicle storage as the at least one piece of combined information, and perform the predetermined operation based on attachment information stored in the vehicle storage as the at least one piece of combined information, after receiving approval of an operator to the second prompt.

The tag transceiver may periodically transmit the beacon signal at a predetermined period, and the vehicle controller may be configured or programmed to perform the predetermined operation based on attachment information stored in the vehicle storage as the at least one piece of combined information, when the vehicle receiver does not receive the beacon signal from the tag transceiver in a predetermined time interval exceeding the predetermined period.

Attachment information may include unchangeable information which is not changeable over time and changeable information which is changeable over time, and the vehicle controller may be configured or programmed, when the vehicle receiver does not receive the beacon signal from the tag transceiver in the predetermined time interval exceeding the predetermined period, while performing the predetermined operation based on attachment information in the beacon signal received from the tag transceiver, to maintain performing the predetermined operation based on unchangeable information of attachment information stored in the vehicle storage as the at least one piece of combined information, and not to perform the predetermined operation based on changeable information of attachment information stored in the vehicle storage as the at least one piece of combined information.

The vehicle controller may be configured or programmed to maintain performing the predetermined operation based on attachment information stored in the vehicle storage as the at least one piece of combined information, when the beacon signal is interrupted while the vehicle controller performs the predetermined operation based on attachment information.

The attachment management system may further include a user interface, wherein the at least one communication tag may include a plurality of communication tags, the vehicle storage stores a plurality of pieces of combined information each including the tag identifiers and a plurality of pieces of attachment information linked to one of the tag identifiers in the beacon signals which the vehicle receiver has received from the tag transceivers of the plurality of communication tags, and the vehicle controller may be configured or programmed to, when the vehicle receiver does not receive the beacon signals from the tag transceivers of the plurality of communication tags, provide on the user interface, a third prompt inquiring about which one of the plurality of pieces of attachment information stored in the vehicle storage as the plurality of pieces of combined information is to be selected, and perform the predetermined operation based on the one of the plurality of pieces of attachment information selected by an operator to the third prompt.

The attachment management system may further include a mobile terminal including a terminal interface and a terminal transceiver, wherein the mobile terminal may be configured or programmed to obtain attachment information through the terminal interface, and transmit attachment information from the terminal transceiver to the tag transceiver, to cause the tag memory to store attachment information.

The terminal interface may be configured or programmed to allow an operator to select attachment information, and transmit attachment information selected by the operator, from the terminal transceiver to the tag transceiver.

The terminal interface may be configured or programmed to allow an operator to input attachment information, and transmit attachment information input by the operator, from the terminal transceiver to the tag transceiver.

The terminal interface may be configured or programmed to obtain the tag identifier of the at least one communication tag, and transmit attachment information obtained through the terminal interface, from the terminal transceiver to the tag transceiver corresponding to the tag identifier.

The terminal interface may be configured or programmed to obtain the tag identifier of the at least one communication tag in the beacon signal received by the terminal transceiver from the tag transceiver, and transmit attachment information obtained through the terminal interface, from the terminal transceiver to the tag transceiver corresponding to the tag identifier.

The mobile terminal may include a camera, wherein the at least one communication tag may include an image code recording the tag identifier of the at least one communication tag, and the mobile terminal may be configured or programmed to obtain the tag identifier of the at least one communication tag, by scanning the image code with the camera, and transmit attachment information obtained through the terminal interface, from the terminal transceiver to the tag transceiver corresponding to the tag identifier.

The attachment management system may further include a mobile terminal including a terminal interface and a terminal transceiver; and a server capable of communicating with the terminal communicator of the mobile terminal, wherein the mobile terminal may be configured or programmed to obtain attachment information by communicating with the server, based on an attachment identifier unique to the attachment, which is input or selected through the terminal interface, obtain attachment information by communicating with the server, based on the attachment identifier input through the terminal interface, and transmit obtained attachment information from the terminal transceiver to the tag transceiver corresponding to the tag identifier, to cause the tag memory to store attachment information.

The attachment management system may further include a mobile terminal including a terminal interface and a terminal transceiver; and a server capable of communicating with the mobile terminal, wherein the at least one communication tag may include a plurality of communication tags, the mobile terminal may be configured or programmed to, when received the beacon signals from the plurality of communication tags, display on the terminal interface, the tag identifiers in the beacon signals received from the plurality of communication tags, allow an operator to select one of the tag identifiers in the beacon signals displayed on the terminal interface, and to input an attachment identifier unique to the attachment through the terminal interface, obtain attachment information from the server by communicating with the server based on the attachment identifier selected by the operator, and transmit the beacon signal containing attachment information, from the terminal transceiver to the tag transceiver, to cause the tag memory to store attachment information.

The vehicle controller may be configured or programmed to perform the predetermined operation based on attachment information stored in the vehicle storage as the at least one piece of combined information, when attachment information corresponding to the tag identifier in the beacon signal matches with attachment information corresponding to the tag identifier stored in the vehicle storage as the at least one piece of combined information.

The vehicle controller may be configured or programmed to, when attachment information corresponding to the tag identifier included in the beacon signal does not match with attachment information corresponding to the tag identifier stored in the vehicle storage as the at least one piece of combined information, store a new piece of combined information containing the tag identifier and attachment information linked thereto in the beacon signal which the vehicle receiver is receiving from the tag transceiver, and perform a predetermined operation based on attachment information of the new piece of combined information.

An attachment management system according to another example embodiment of the present invention includes a work vehicle including a vehicle storage, a vehicle receiver, and a vehicle controller; a plurality of attachments each detachably coupled to the work vehicle; and a plurality of communication tags, each of which is interchangeably fixed to one of the plurality of attachments, and includes a tag transceiver to communicate with the vehicle receiver through a beacon signal that is compliant with a near field communication standard, and a tag memory to store a piece of combined information including a tag identifier unique to one of the plurality of communication tags and attachment information unique to one of the plurality of attachments, to which the one of the plurality of communication tags is fixed, wherein the vehicle storage may store a plurality of pieces of combined information, each of which includes one of the tag identifiers and one piece of attachment information linked thereto, the plurality of pieces of combined information obtained through the beacon signals which the vehicle receiver has received from the tag transceivers of the plurality of communication tags, and the vehicle controller may be configured or programmed to, at a timing when or after one of the plurality of attachments is selected, determine that one of the plurality of communication tags fixed on one of the plurality of attachments is changed to another of the plurality of communication tags, when the one piece of attachment information linked to one of the tag identifiers, which are obtained through one of the beacon signals received by the vehicle receiver, does not match with another piece of attachment information linked to the one of tag identifiers stored in the vehicle storage as one of the plurality of pieces of combined information, control the vehicle storage to store a new piece of combined information containing the one of the tag identifiers and the one piece of attachment information linked thereto, in one of the beacon signals which the vehicle receiver is receiving from one of the tag transceivers of the plurality of communication tags, and perform a predetermined operation based on the one piece of attachment information of the new piece of combined information.

The vehicle controller may be configured or programmed to determine that the one of the plurality of attachments is selected, when the vehicle receiver receives the beacon signal from one of the plurality of communication tags fixed on the one of the plurality of attachments, of which a Received Signal Strength Indicator is highest among the plurality of communication tags fixed on the plurality of the attachment arranged around the work vehicle.

The attachment management system may further include a user interface, wherein the vehicle controller may be configured or programmed to provide and sort on the user interface, the plurality of pieces of attachment information, based on Received Signal Strength Indicators of the beacon signals received by the vehicle receiver from the plurality of communication tags fixed on the plurality of attachments arranged around the work vehicle, provide on the user interface, a fourth prompt inquiring about which one of the plurality of pieces of attachment information is to be selected, and determine that the one of the plurality of attachments is selected by an operator to the fourth prompt through the user interface.

The attachment management system may further include a notifier to provide notification, wherein the vehicle controller may be configured or programmed to control the notifier to provide an alarm before controlling the vehicle storage to store the new piece of combined information.

The attachment management system may further include a user interface, wherein the vehicle controller may be configured or programmed to, provide on the user interface, a first prompt inquiring about whether to store in the vehicle storage, the tag identifier and attachment information linked thereto in one of the beacon signals received from one of the plurality of communication tags, as the new piece of combined information, before controlling the vehicle storage to store the new piece of combined information, and control the vehicle storage to store the tag identifier and attachment information linked thereto in the one of the beacon signals received from the one of the plurality of communication tags, as the new piece of combined information, after receiving approval of an operator to the first prompt.

The attachment management system may further include a user interface, wherein the vehicle controller may be configured or programmed to, when at least either one of the tag identifier and attachment information in the beacon signal which the vehicle receiver is receiving from the tag transceiver, does not match with the tag identifier and attachment information stored in the vehicle storage as the one of the plurality of pieces of combined information, provide on the user interface, the tag identifier and attachment information stored in the vehicle storage as the one of the plurality of pieces of combined information, and a second prompt inquiring about whether to perform the predetermined operation based on the tag identifier and attachment information stored in the vehicle storage as the one of the plurality of pieces of combined information, and perform the predetermined operation based on attachment information included in the one of the plurality of pieces of combined information, after receiving approval of an operator to the second prompt.

Each of the tag transceivers of the plurality of communication tags may periodically transmit the beacon signal at a predetermined period, and the vehicle controller may be configured or programmed to perform the predetermined operation based on the one piece of attachment information stored in the vehicle storage as the one of the plurality of pieces of combined information, when the vehicle receiver does not receive the beacon signals from the tag transceivers in a predetermined time interval exceeding the predetermined period.

Each of the plurality of pieces of attachment information may include unchangeable information which is not changeable over time and changeable information which is changeable over time, the vehicle controller is configured or programmed, when the vehicle receiver does not receive the beacon signals from the tag transceivers in the predetermined time interval exceeding the predetermined period, while performing the predetermined operation based on the one piece of attachment information in the beacon signal received from the tag transceiver of one of the plurality of communication tags, to maintain performing the predetermined operation based on unchangeable information of the one piece of attachment information stored in the vehicle storage as the one of the plurality of pieces of combined information, and not to perform the predetermined operation based on changeable information of the one piece of attachment information stored in the vehicle storage as the one of the plurality of pieces of combined information.

The vehicle controller may be configured or programmed to maintain performing the predetermined operation based on the one piece of attachment information stored in the vehicle storage as the one of the plurality of pieces of combined information, when the beacon signal is interrupted while the vehicle controller performs the predetermined operation based on the one piece of attachment information.

The attachment management system may further include a mobile terminal including a terminal interface and a terminal transceiver, wherein the mobile terminal may be configured or programmed to obtain the one piece of attachment information through the terminal interface, and transmit the one piece of attachment information, from the terminal transceiver to the tag transceiver, to cause the tag memory to store the one piece of attachment information.

The terminal interface may be configured or programmed to allow an operator to select the one piece of attachment information, and the one piece of attachment information selected by the operator is transmitted from the terminal transceiver to the tag transceiver.

The terminal interface is configured or programmed to allow an operator to input the one piece of attachment information, and the one piece of attachment information input by the operator may be transmitted from the terminal transceiver to the tag transceiver.

The terminal interface may be configured or programmed to obtain the one of the tag identifiers of one of the communication tags, and transmit the one piece of attachment information obtained through the terminal interface, from the terminal transceiver to one of the tag transceivers corresponding to the one of the tag identifiers.

The terminal interface may be configured or programmed to obtain the one of the tag identifiers of the one of the communication tags in the one of the beacon signals received by the terminal transceiver from the one of the tag transceivers, and transmit the one piece of attachment information obtained through the terminal interface from the terminal transceiver to the one of tag transceivers corresponding to one of the tag identifiers.

The mobile terminal may include a camera, and the one of the communication tags may include an image code recording the tag identifier of the one of the communication tags. The mobile terminal may be configured or programmed to obtain one of the tag identifiers of the one of the communication tags, by scanning the image code with the camera, and transmit the one piece of attachment information obtained through the terminal interface from the terminal transceiver to the one of the tag transceivers corresponding to the one of the tag identifiers.

The attachment management system may further include a mobile terminal including a terminal interface and a terminal transceiver, and a server capable of communicating with the terminal communicator of the mobile terminal, wherein each of the plurality of pieces of attachment information may include an attachment identifier unique to the attachment, to which one of the communication tags is fixed. The mobile terminal may be configured or programmed to obtain the one piece of attachment information by communicating with the server, based on the one of the attachment identifiers input through the terminal interface, and transmit the one piece of attachment information from the terminal transceiver to the tag transceiver corresponding to the tag identifier, to cause the tag memory to store the one piece of attachment information.

The attachment management system may further include a mobile terminal including a terminal interface and a terminal transceiver, and a server capable of communicating with the mobile terminal, wherein each of the plurality of pieces of attachment information may include an attachment identifier unique to the attachment, to which one of the communication tags is fixed, the mobile terminal may be configured or programmed to, when received the beacon signals from the plurality of communication tags, display on the terminal interface, the tag identifiers in the beacon signals received from the plurality of communication tags, allow an operator to select one of the tag identifiers in the beacon signals displayed on the terminal interface, and to input one of an attachment identifier unique to the attachment corresponding to the selected one of the tag identifiers, through the terminal interface, obtain one of the plurality of pieces of attachment information from the server by communicating with the server based on the input one of the attachment identifiers, and transmit the beacon signal containing obtained one of the plurality of pieces of attachment information, from the terminal transceiver to the tag transceiver, to cause the tag memory to store attachment information.

The one piece of attachment information may include at least one of information indicating a name and specification of the one of the plurality of attachments, information indicating a rated flowrate of hydraulic operation fluid from the work vehicle to the one of the plurality of attachments, information indicating an operating time of the one of the plurality of attachments, or information indicating a state of capacity of one of the tag batteries that supplies power to the tag memory and the tag transceiver of the one of the plurality of beacon tags.

The user interface may include at least one of a vehicle interface on the work vehicle, an input/output device on an external terminal capable of communicating with a vehicle communicator, or a terminal interface on the mobile terminal capable of communicating with the vehicle communicator.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 7 shows a first prompt screen (Prompt 1) displayed on a vehicle interface.

FIG. 9 shows a second prompt screen (Prompt 2) displayed on the vehicle interface.

FIG. 10 shows a third prompt screen (Prompt 3) displayed on the vehicle interface.

FIG. 12 shows a fourth prompt screen (Prompt 4) displayed on the vehicle interface.

DETAILED DESCRIPTION OF THE EXAMPLE EMBODIMENTS

Figure 1:
FIG. 1 is a conceptual diagram showing a schematic overall configuration of an attachment management system according to an example embodiment of the present invention.

Example embodiments will now be described with reference to the accompanying drawings, wherein like reference numerals designate corresponding or identical elements throughout the various drawings. The drawings are to be viewed in an orientation in which the reference numerals are viewed correctly.

FIG. 1 is a conceptual view of an attachment management system 100, showing an overall structure thereof, according to an example embodiment of the present invention. As shown in FIG. 1, the attachment management system 100 generally includes a work vehicle 1, at least one attachment 30, or preferably a plurality of attachments 30 (30-1, . . . , 30-N), a mobile terminal 40, and a server 50. Each of the plurality of attachments 30 (30-1, . . . , 30-N) is configured to be detachably coupled to the work vehicle 1. FIG. 1 illustrates the work vehicle 1 with the attachment 30 detached therefrom. Also as shown in FIG. 1, the attachment management system 100 may include an external terminal 60.

Figure 2:
FIG. 2 is a side view of a work vehicle, showing various components thereof.

FIG. 2 is a side view of the work vehicle 1 shown in FIG. 1 with the attachment 30 attached thereto, illustrating detailed structures of components thereof. In the present example embodiment, a compact track loader is discussed as an example of the work vehicle 1. Note, however, that the work vehicle according to the example embodiment of the present invention is not limited to a compact track loader, and may be, for example, some other construction machine such as a skid-steer loader and a backhoe (or an excavator), or an agricultural machine such as a tractor.

The work vehicle 1 includes a machine body 2, a cabin 3, a work device 4 (including an attachment 30), and traveling devices 5. The cabin 3 is provided on the machine body 2. The attachment 30 shown in FIG. 2 is a bucket.

The cabin 3 includes an operator's seat 8, operation members (manual operators) to be operated by an operator seated on the operator's seat 8, and/or the like. The operation members include a travel operation member 6 to operate the traveling devices 5 and a work operation member 7 to operate the work device 4.

The traveling devices 5 are provided on the left and right sides of the machine body 2 and support the machine body 2 such that the machine body 2 is allowed to travel. The traveling devices 5 are crawler-based traveling devices. The operator operates the travel operation member 6 to cause both the left and right traveling devices 5 to rotate in a forward direction, both the left and right traveling devices 5 to rotate in a reverse direction, only one of the left and right traveling devices 5 to rotate in the forward direction, or one of the left and right traveling devices 5 to rotate in the forward direction and the other to rotate in the reverse direction to cause the machine body 2 (work vehicle 1) to travel forward, rearward, pivot-turn or spin-turn left or right. Note that the traveling devices 5 may be tire-based traveling devices.

The work device 4 is attached to the machine body 2. The work device 4 includes an attachment 30, a coupling device 16, and a position changing device C. The attachment 30 is a working tool such as a bucket, which can be attached to or detached from the coupling device 16. The attachment may be any other working tools, including, for example, earth augers, angle blooms, crushers, grapples, cold planers, sweepers, skid cutters, skid graders, stamp grinders, snow blowers, snow pushers, spreaders, and dozer blades, trenchers, breakers, pallet forks, hopper blooms, mowers, rippers, loader booms, and rotary tillers. Those attachments 30 include various different specifications such as operations to be performed, structures, sizes, and shapes.

The coupling device 16 is a device provided on the position changing device C, such that the attachment 30 can be attached to or detached from the machine body 2. Thus, the position changing device C is a device configured to change a position of the coupling device 16 relative to the machine body 2. The position changing device C has one end or rear end connected to the machine body 2, and the other end or front end provided with the coupling device 16. The position changing device C moves up and down the coupling device 16 to change a position of the coupling device 16 relative to the machine body 2, which in turn moves up and down the attachment 30 relative to the machine body 2.

In the present example embodiment, the position changing device C includes booms 11, lift links 12, control links 13, boom cylinders 14, front cylinders 15, which are provided left and right sides of the cabin 3. The left and right booms 11 are connected to each other by a connector 17 at an intermediate portion of the booms 11. The left boom 11 has, at the front portion thereof, a hydraulic fluid outlet port (power output port) 18*a* and a hydraulic fluid inlet port 18*b*.

The lift links 12 and the control links 13 support proximal portions (rear portions) of the booms 11 via shafts such that the booms 11 are swingable up and down. The boom cylinders 14 each have one end thereof pivotally connected to a corresponding one of the booms 11 via a shaft and the other end thereof pivotally connected to a lower rear portion of the machine body 2 via a shaft. Upon operation of the work operation member 7 along a first direction by the operator of the work vehicle 1, the boom cylinders 14 extend or retract and the booms 11 ascend or descend (swing upward or downward).

Note, however, that the above structure of the position changing device C is not limited thereto, and may include arms and booms and/or the like when the work vehicle is a backhoe, and may be an elevator such as a three-point linkage mechanism, when the work vehicle is a tractor.

The coupling device 16 may be a quick hitch capable of coupling the attachment 30 to the machine body 2, or decoupling the attachment 30 from the machine body 2. The booms 11 are provided with the quick hitch 16 at the distal ends thereof. The quick hitch 16 is a linkage configured to easily attach and detach any of various attachments (hydraulic driven working tools) 30 such as the bucket. The operator of the work vehicle 1 can easily change attachments 30 using the quick hitch 16. The quick hitch 16 is therefore also called "quick changer". In the example shown in FIG. 2, the bucket 30 which is an example of the attachment 30 is attached to a front portion of the quick hitch 16.

The quick hitch 16 has, connected to a rear portion thereof, the distal ends of the booms 11 and ends of the front cylinders 15 via respective shafts such that the booms 11 and the front cylinders 15 are pivotable. The opposite ends of the front cylinders 15 are pivotally connected to the connector 17 via shafts. Upon operation of the work operation member 7, the front cylinders 15 extend or retract and the quick hitch 16 swings upward or rearward. With this, the bucket 30 attached to the quick hitch 16, swinging upward or downward, performs shoveling or dumping.

Each of the attachments 30 includes a communication tag 33 (referred to also as a "beacon tag 33" herein) fixed thereon. Specifically, the beacon tag 33 is fixed on the back portion of the attachment 30 via any appropriate fixing members such as bolts and nuts, and/or the like. Thus, the beacon tag 33 is interchangeably fixed on each of the attachments 30. For example, in cases where the beacon tag 33 fails or malfunctions, and the battery inside the beacon tag 33 is exhausted and need to be exchanged, a new beacon tag 33 can be fixed on the attachment 30 instead of old one. One beacon tag 33 which has been fixed on one attachment 30 can be replaced and fixed on another attachment 30. Note that International Application Publication WO 2024/081645 A1 entitled "Work Machine with Wireless Transceiver" discloses a communication tag fixed on the back portion of the attachment, of which, the entire contents are incorporated herein by reference.

Figure 3:
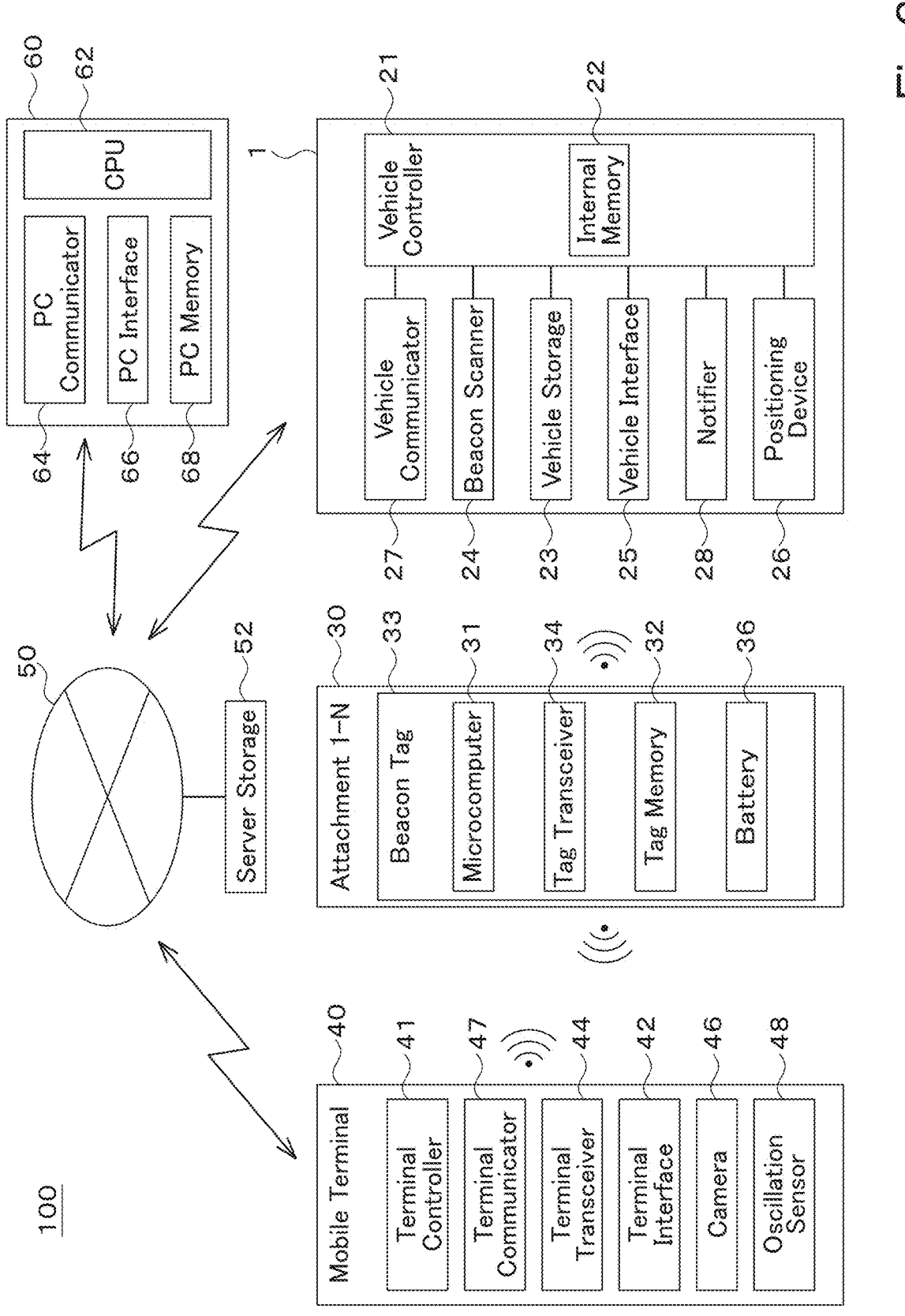
FIG. 3 is a block diagram, showing structural features of the attachment management system shown in FIG. 1.

FIG. 3 is a block diagram showing schematic structures of the work vehicle 1, a plurality of attachments 30 each including beacon tags 33, and the mobile terminal 40 of the attachment management system of FIG. 1. Each of beacon tags 33 can be interchangeably fixed on the attachment 30, for example due to failure thereof or due to operation to be performed by the attachment 30 fixed thereon.

Each of the beacon tags 33, actually fixed on or to be fixed on the attachment 30, includes a tag transceiver 34 which is configured to periodically transmit and receive a wireless signal (referred to as a "beacon signal" herein) compliant with a near field communication standard such as RFID (Radio Frequency Identification) and BLE (Bluetooth® Low Energy). Each of the beacon tags 33 also includes a tag memory 32 to store a tag identifier unique thereto (referred to simply as a "tag ID" herein), and a microcomputer 31 to control the tag transceiver 34 and the tag memory 32, and a battery 36 to supply power to those components of the beacon tag 33.

Figure 4:
FIG. 4 is a conceptual view illustrating exemplary data included in a beacon signal which is transmitted from and received by a beacon tag.

FIG. 4 is a conceptual view illustrating exemplary data in the beacon signal which is transmitted from and received by a beacon tag 33. The beacon signal contains a header, a tag ID (or tag serial number), attachment information. Attachment information includes an attachment identifier unique to the attachment 30, on which the beacon tag 33 is fixed. Besides, attachment information includes a name, a type, a model number, a specification of the attachment 30, and/or the like. Since the beacon signal transmitted from the beacon tag 33 is a signal containing its own tag ID but no data to identify the receiver, the beacon signal is called as a broadcasting signal. Note that a newly purchased beacon tag 33 can be interchangeably fixed to one of the attachments 30 so that the beacon signal transmitted therefrom contains its tag ID only and no other attachment information associated with the attachment 30.

After the beacon tag 33 is newly purchased, the operator is required through the mobile terminal 40, to set or store attachment information unique to the attachment 30, to which the beacon tag 33 is to be fixed, in the tag memory 32 as an initial setting. Attachment information may contain an attachment identifier (an attachment ID) unique to the attachment 30, and in addition, various information about a name, type (Att. Type), model number (Att. Model), size and/or shape, specification (Att. Spec.) such as the maximum permissible flow rate of hydraulic fluid to be supplied to the attachment 30, state of charge (SOC) of the battery 36, cumulative operating time (e.g., hour meter), and/or the like of the attachment 30.

The beacon tag 33 transmits the beacon signal containing the tag ID unique to the beacon tag 33 which is stored in the tag memory 32. The mobile terminal 40 obtains attachment information containing the attachment ID unique to the attachment 30. Then, the mobile terminal 40 transmits the beacon signal containing the particular tag ID and the attachment information. Thus, the beacon signal transmitted from the mobile terminal 40 contains the header, the tag ID (or a tag serial number), and attachment information obtained based on the attachment ID. The beacon tag 33 stores attachment information in the beacon signal, when receiving the beacon signal containing its own tag ID. In other words, the mobile terminal 40 has a function performing as a reader/writer on the tag memory 33.

On the other hand, the beacon tag 33, of which tag memory 32 has already stored attachment information (when it is ready to be used), transmits (or broadcasts) the beacon signal containing the tag ID and attachment information. A beacon scanner 24 of the work vehicle 1 receives and reads the beacon signal containing the tag ID and attachment information, so that a vehicle controller 21 of the work vehicle 1 recognizes the attachment 30 coupled with the coupling device 16.

The vehicle controller 21 is configured or programmed to control the attachment 30 based on recognized attachment information in the received beacon signal. For example, the vehicle controller 21 may be configured or programmed to control hydraulic fluid (power) to be supplied to the attachment 30 coupled with the coupling device 16, based on recognized attachment information. In this case, the vehicle controller 21 controls at least either one of input of hydraulic fluid from the attachment 30, and output amount and output pressure of hydraulic fluid supplied to the attachment 30. In addition, the vehicle controller 21 may be configured or programmed to control a vehicle interface 25 to provide or display information that the attachment 30 is coupled with the coupling device 16 (or the work vehicle 1). The vehicle interface 25 may be any types of input/output devices such as a touch panel, monitor, keyboard, and mouth, as far as it receives/provides information from/to the operator.

While the above description discusses about the case where the initial setting is required for the newly purchased beacon tag 33, attachment information may have already been stored in the tag memory 32 of the beacon tag 33 in a case where the beacon tag 33 is sold with attachment information of the attachment 30 linked with the beacon ID of the beacon tag 33.

In particular, the microcomputer 31 of the beacon tag 33 is configured or programmed to control the tag transceiver 34 to periodically transmit the beacon signal containing the beacon ID and attachment information stored in the tag memory 32, in a predetermined period of one to three seconds, for example. When receiving the beacon signal, the microcomputer 31 of the beacon tag 33 is configured or programmed to determine whether the beacon signal contains its own tag ID, and if it does, the microcomputer 31 is configured or programmed to cause the tag memory 32 to store attachment information in the beacon signal or overwrite attachment information with one in the beacon signal.

The mobile terminal 40 typically includes a terminal device such as a smartphone and a tablet computer, and may be a mobile laptop PC (Personal Computer), and even a standalone terminal device, which is not limited thereto. The mobile terminal 40 includes a terminal communicator 47 capable of communicating with a server (including a cloud server) via the Internet and wireless LAN (Local Area Network). The mobile terminal 40 includes a terminal interface 42 (which may be referred to also as a "touch panel 42" herein) to allow the operator to input/output information (displaying or providing information). The mobile terminal 40 also includes a terminal transceiver 44 to receive the beacon signals from a plurality of beacon tags 33 and transmit the beacon signal containing particular or selected one of tag IDs to the beacon tag 33.

The terminal interface 42 is embodied as the touch panel of the smartphone and/or the like. The mobile terminal 40 may include a camera 46 implemented by CCDs (Charge Coupled Devices) or CMOS (Complementary Metal Oxide Semiconductor) image sensors. The mobile terminal 40 includes a terminal controller 41 configured to control the terminal communicator 47, the terminal transceiver 44, and the camera 46.

The terminal controller 41 is processing circuitry including one or more processors such as CPU (Central Processing Unit), DPU (Digital Signal Processor), FPGA (Field Programmable Gate Array) and ASIC (Application Specific Integrated Circuit).

As described above, the attachment management system 100 includes a work vehicle 1, a plurality of attachments 30 (30-1, . . . , 30-N) each detachably coupled to the work vehicle 1, a mobile terminal 40 including a terminal interface 42 (touch panel 42), and a plurality of communication tags 33, each of which is interchangeably fixed to one of the plurality of attachments 30, and communicates with the mobile terminal 40 through the beacon signal that is compliant with a near field communication standard. The attachment management system 100 may also include an external terminal 60.

The external terminal 60 is a general personal computer. Similar to the mobile terminal 40, the external terminal 60 includes a PC communicator 64 capable of communicating with a server (including a cloud server) via the Internet and wireless LAN (Local Area Network), an input/output device 66 (referred to simply as "PC interface 66") to input/output information, a non-volatile PC memory 68 to store various information, and a PC controller 62 (referred to simply as "CPU 62") to control above components. The CPU 62 is structured similarly to the terminal controller 41 as described above. The PC interface 66 may be any types of input/output devices such as a touch panel, monitor, keyboard, and mouth, as far as it receives/provides information from/to the operator, for example.

The work vehicle 1 includes a beacon scanner 24 to receive the beacon signals from the plurality of communication tags 33, and a vehicle communicator 27 to communicate with the server (cloud server) via the Internet and wireless LAN. The work vehicle 1 also includes a vehicle storage 23, a vehicle interface 25 to allow the operator to input/output information (displaying or providing information), and a notification device or notifier 28 to provide an alarm to the operator if information in the beacon signal received by the beacon scanner 24 has not been stored in the vehicle storage 23, a vehicle controller 21 to control the above-described components. Furthermore, the work vehicle 1 may include a positioning device 26 to identify its own position of the work vehicle 1.

In particular, the vehicle controller 21 may include processing circuitry including one or more processors. The vehicle controller 21 is configured or programmed to communicate with the vehicle communicator 27, the beacon scanner 24, the vehicle storage 23, the vehicle interface 25, the positioning device 26, other various on-board devices on the work vehicle 1, via an in-vehicle network such as CAN, ISOBUS, LIN and, FlexRay, and control the on-board devices to perform various operations of the work vehicle 1.

The vehicle controller 21 may include one or more memories, and a variety of analog and digital circuits. The one or more memories store (memorize) software programs and various data to cause the one or more processors to perform functions. In particular, the one or more memories of the vehicle controller 21 includes an internal memory 22 which is formed of a volatile or non-volatile memory. The vehicle controller 21 uses a predetermined memory region of the non-volatile memory, as a buffer memory for temporarily memorizing information.

The vehicle controller 21 is connected to the vehicle storage 23 (non-volatile memory) for communication therebetween, which is provided outside the vehicle controller 21. The internal memory 22 and the vehicle storage 23 store several software programs and various control data to control operation of each of the devices of the work vehicle 1. The vehicle storage 23 stores a plurality of pieces of attachment information corresponding to the plurality of attachments 30.

The vehicle controller 21 is connected to read software programs and control data using one or more processors, enabling it to perform various operations based on these inputs. Additionally, the vehicle controller 21 can execute operations based on predetermined logic circuitry implemented within the processors.

Similar to the terminal controller 41 of the mobile terminal 40, the processors including the vehicle controller 21 include CPU (Central Processing Unit), DPU (Digital Signal Processor), FPGA (Field Programmable Gate Array), and ASIC (Application Specific Integrated Circuit).

The vehicle controller 21 is capable of performing various operations in coordination with multiple physically separate processors. Moreover, the structure of the vehicle controller 21 is not limited to these components. For example, these processors could be mounted on physically separate computers and interconnected via networks such as an in-vehicle network, LAN, or WAN, and Internet.

The positioning device 26 is equipped with a GNSS (Global Navigation Satellite System) receiver. The GNSS receiver includes processing circuitry that determine the position of the work vehicle 1 based on signals from GNSS satellites. The positioning device 26 determines its own current position (e.g., latitude and longitude) based on GNSS signals transmitted from GNSS satellites. GNSS refers to a collective term for satellite positioning devices such as GPS (e.g., Michibiki), QZSS, GLONASS, Galileo, and BeiDou. Additionally, while the positioning device 26 determines the position (current position) of the work vehicle 1 using a GNSS receiver, it may also detect the current position by other means. For example, sensing devices such as LiDAR may be provided on the vehicle body 2, and the positioning device 26 may estimate (determine) the current position based on the results sensed by the sensing devices and map information (environmental map information) stored in the vehicle storage 23.

The server 50 includes a server storage 52, which can store a plurality of pieces of attachment information of various attachments 30 or corresponding to the plurality of attachments 30 as well as the vehicle storage 23.

The terminal transceiver 44 of the mobile terminal 40 and the beacon scanner 24 of the working vehicle 1 can detect the received signal strength (which may be referred to simply as "RSSI", Received Signal Strength Indicator) of the beacon signal. The terminal interface 42 of the mobile terminal 40 and the vehicle interface 25 can both display the RSSI of the received beacon signal. While the beacon scanner 24 is described herein as a device to receive the beacon signal from the beacon tag 33, it should be noted that the device may also transmit the beacon signal such that it may be configured as a vehicle transceiver.

Figure 5:
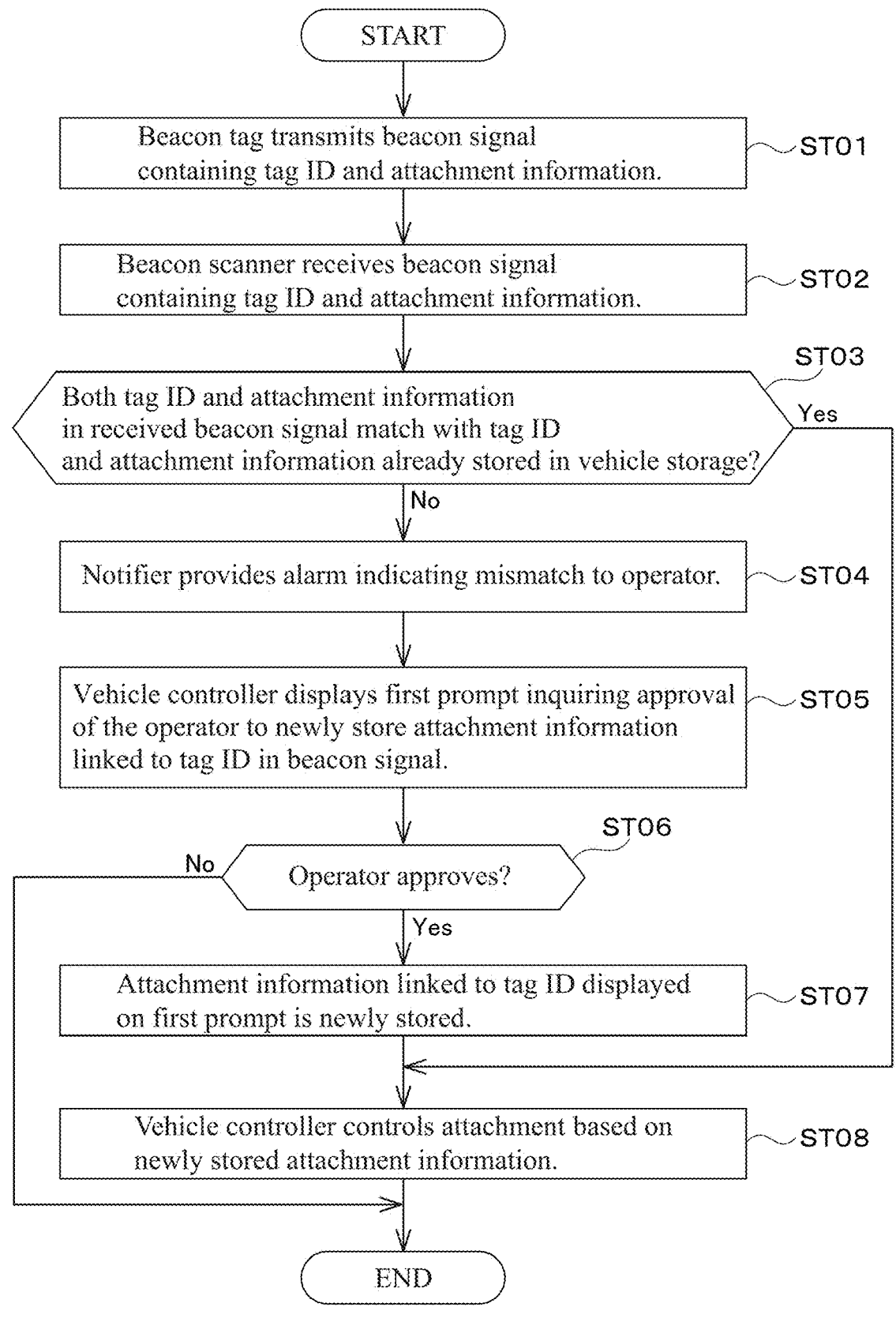
FIG. 5 is a flowchart showing a process according to an example embodiment in which a vehicle controller performs a predetermined process based on attachment information.

Next, with reference to FIGS. 5-12, an example embodiment and variations of a process or a series of steps performed by the components of the attachment management system 100 will be described hereinafter. FIG. 5 is a flowchart showing a process in which the beacon scanner 24 of the work vehicle 1 receives a beacon signal and the vehicle controller 21 performs a predetermined process based on attachment information (for example, the vehicle controller 21 controls the attachment 30 based on attachment information).

In step ST01 of FIG. 5, the beacon tag 33 periodically transmits or broadcasts the beacon signal containing the tag ID and a piece of attachment information stored in the tag memory 32 at intervals of 1 to 3 seconds, for example. In step ST02, the beacon scanner 24 of the work vehicle 1 receives the beacon signal containing the tag ID and the piece of attachment information. In the present application, the tag ID and the piece of attachment information in the beacon signal are received by the beacon scanner 24 and stored in the vehicle storage 23, which are linked to each other and may be referred to combined information in the vehicle storage 23. The tag ID and the piece of attachment information may be referred to simply as the "stored tag ID" and the "stored piece of attachment information" stored as combined information in the vehicle storage 23.

In step ST03, the vehicle controller 21 of the work vehicle 1 determines whether both the tag ID and the piece of attachment information included in the beacon signal that is being received by the beacon scanner 24 match with the stored tag ID and the stored piece of attachment information included in combined information already stored in the vehicle storage 23. When the vehicle controller 21 determines that both the tag ID and the piece of attachment information in the beacon signal received by the beacon scanner 24 match with the stored tag ID and the stored piece of attachment information in combined information already stored in the vehicle storage 23 (in case of "YES"), the vehicle controller 21 proceeds to step ST03 and performs the predetermined operation based on the stored piece of attachment information. Performing the predetermined operation based on the stored piece of attachment information includes controlling the attachment based on the stored piece of attachment information, and besides includes controlling flow rate or pressure of hydraulic operation fluid supplied to the attachment 30 not to exceed the maximum permissible value of the attachment 30, and controlling the vehicle interface 25 to display a SOC (state of capacity) of the battery 36 of the beacon tag 33. For simplifying the description and facilitating understandings of the present invention, the expression that "the vehicle controller controls the attachment" is conveniently used hereinafter.

In step ST03, when the vehicle controller 21 determines that at least either one of the tag ID and the piece of attachment information in the beacon signal does not match with the stored tag ID and the stored piece of attachment information stored as combined information in the vehicle storage 23 (in case of "NO"), the vehicle controller 21 proceeds to step ST04. Thus, when the vehicle controller 21 determines that either or both of the tag ID and the piece of attachment information in the beacon signal does not match with the stored tag ID and the stored piece of attachment information stored as combined information in the vehicle storage 23 (in case of "NO"), the vehicle controller 21 proceeds to step ST04.

In step ST03, when the vehicle controller 21 determines that either or both of the tag ID and the piece of attachment information in the beacon signal received by the beacon scanner 24 does not match with the stored tag ID and the stored piece of attachment information in combined information stored in the vehicle storage 23 (in case of "NO"), in step ST04, the vehicle controller 21 controls the notifier 28 to provide the operator with notification of mismatch between the tag ID and the piece of attachment information in the beacon signal and stored ones in combined information. The notifier 28 may use a buzzer or chime to provide an audible alarm and/or use the vehicle interface 25 to provide a visual alarm in a periodical or continuing manner. The vehicle interface 25 may be provided with a graphical switch to cease the alarm.

The notifier 28 may be provided in the work vehicle 1 as well as in the external terminal 60 and/or the portable terminal 40. Besides the vehicle interface 25, the terminal interface 42 and/or the PC interface 66 may be used to output the visual alarm to the operator. In the present application, the vehicle interface 25, the PC interface 66 and the terminal interface 42 may be collectively referred to as a "user interface UI" herein.

Figure 6A:
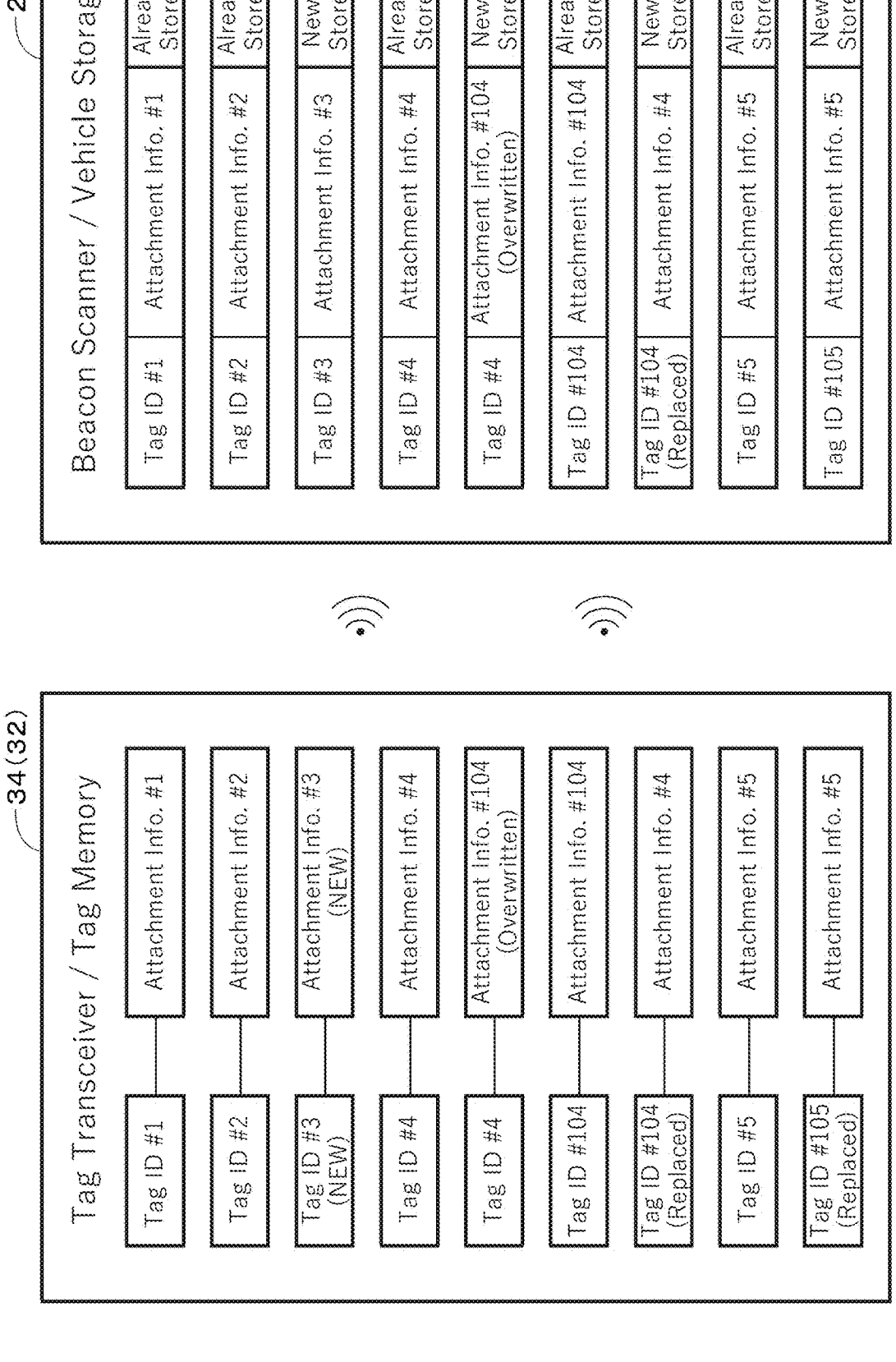
FIGS. 6A to 6F are conceptual diagrams showing a plurality of tag IDs and a plurality of pieces of attachment information included in a plurality of beacon signals, and a plurality of tag IDs and a plurality of pieces of attachment information stored as combined information in a vehicle storage.

With reference to FIGS. 6A to 6F, the determination in step ST03 by the vehicle controller 21 will now be described in more detail. FIGS. 6A to 6F are conceptual diagram showing a plurality of tag IDs and a plurality of pieces of attachment information in a plurality of beacon signals, and a plurality of tag IDs and a plurality of pieces of attachment information stored as a plurality of pieces of combined information in the vehicle storage 23. That is, the left columns of FIGS. 6A to 6F indicate the plurality of tag IDs and the plurality of pieces of attachment information, which are stored in the tag memory 32 and transmitted from the tag transceiver 34. On the other hand, the right columns of FIGS. 6A to 6F indicate the plurality of tag IDs and the plurality of pieces of attachment information, which are stored in the vehicle storage 23 as the plurality of pieces of combined information. FIG. 6A is a collective conceptual diagram that integrates conceptual diagrams of FIGS. 6B to 6F.

Figure 6B:
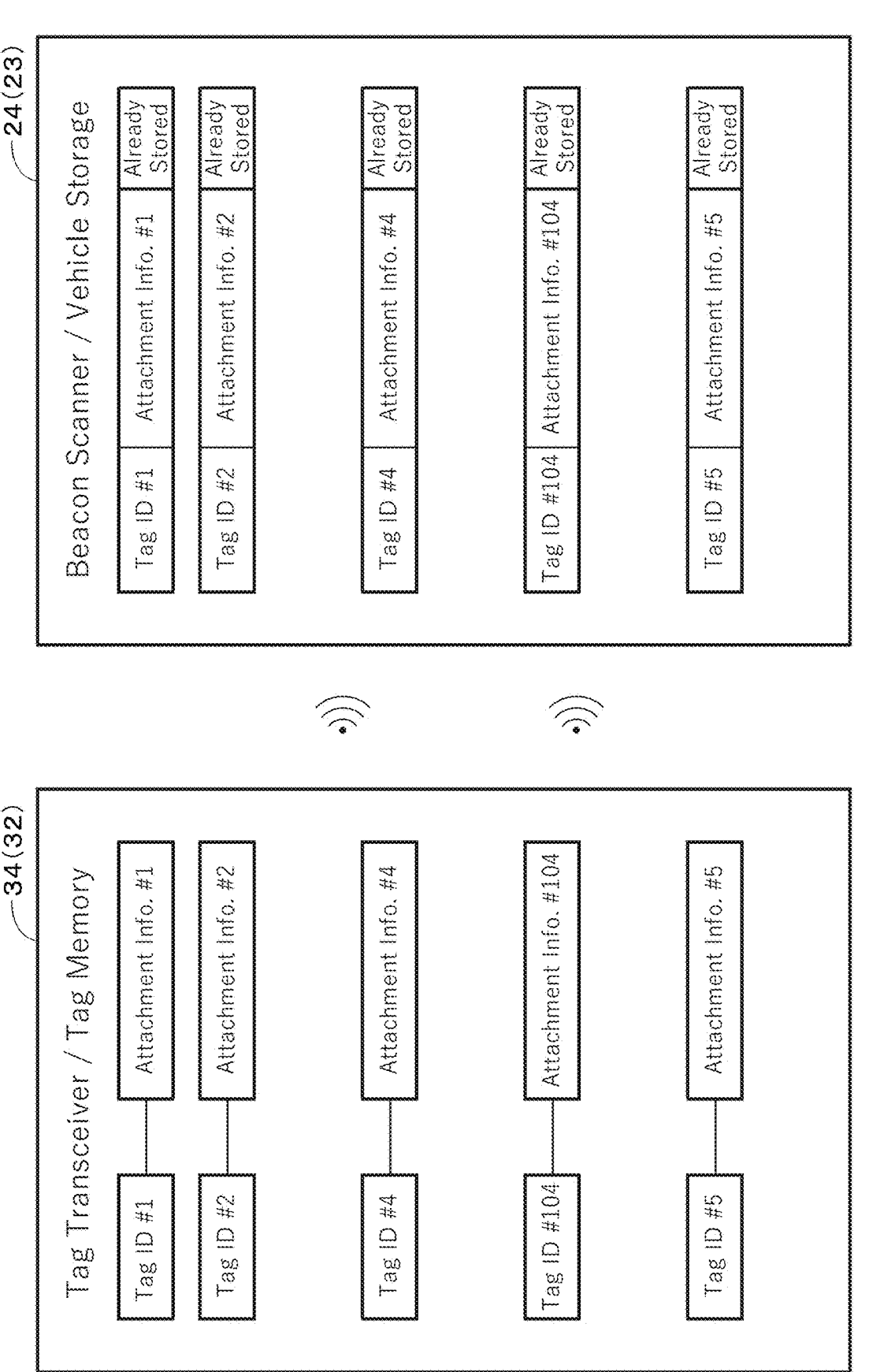
Figure 6C:
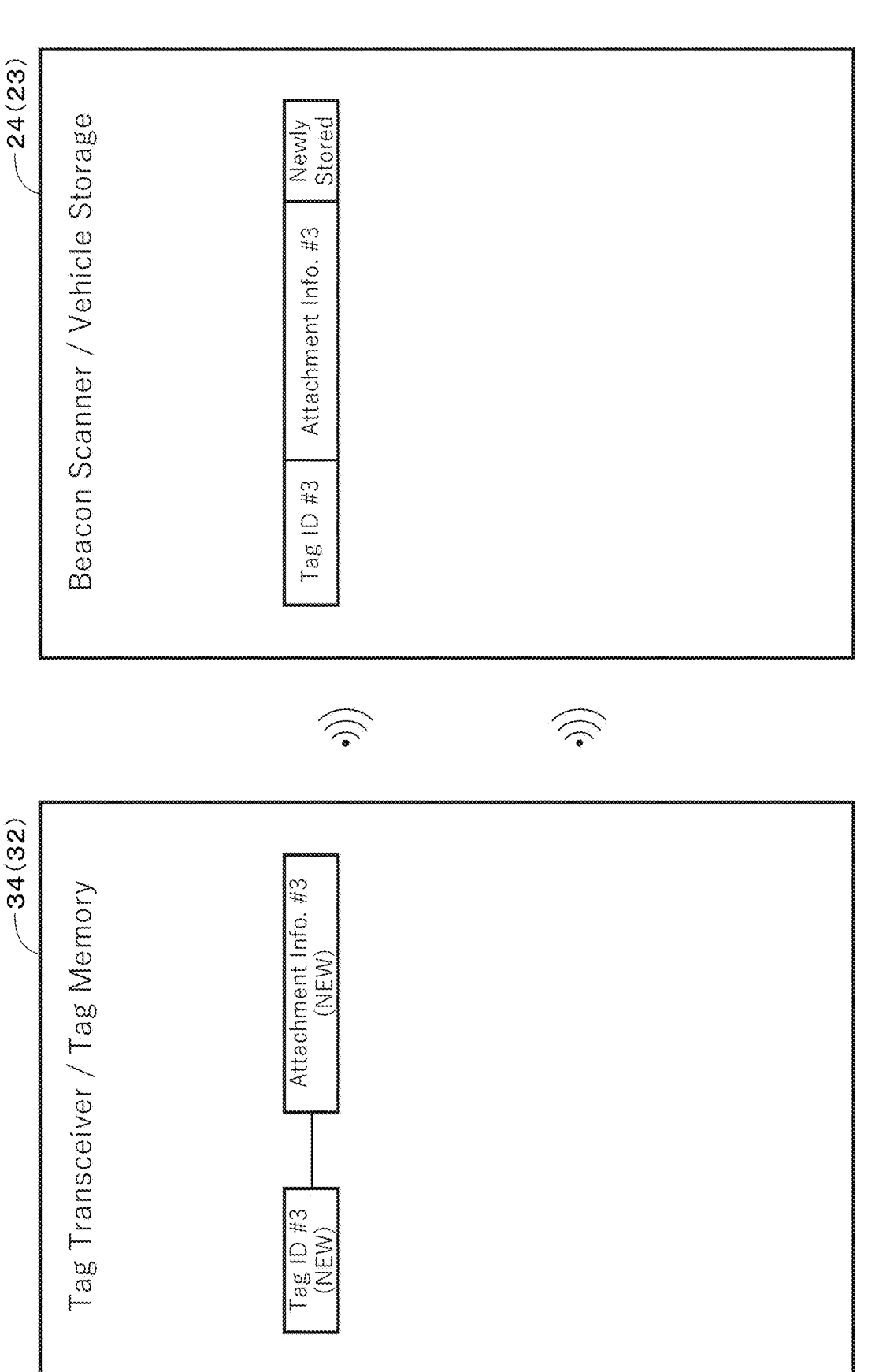
Figure 6D:
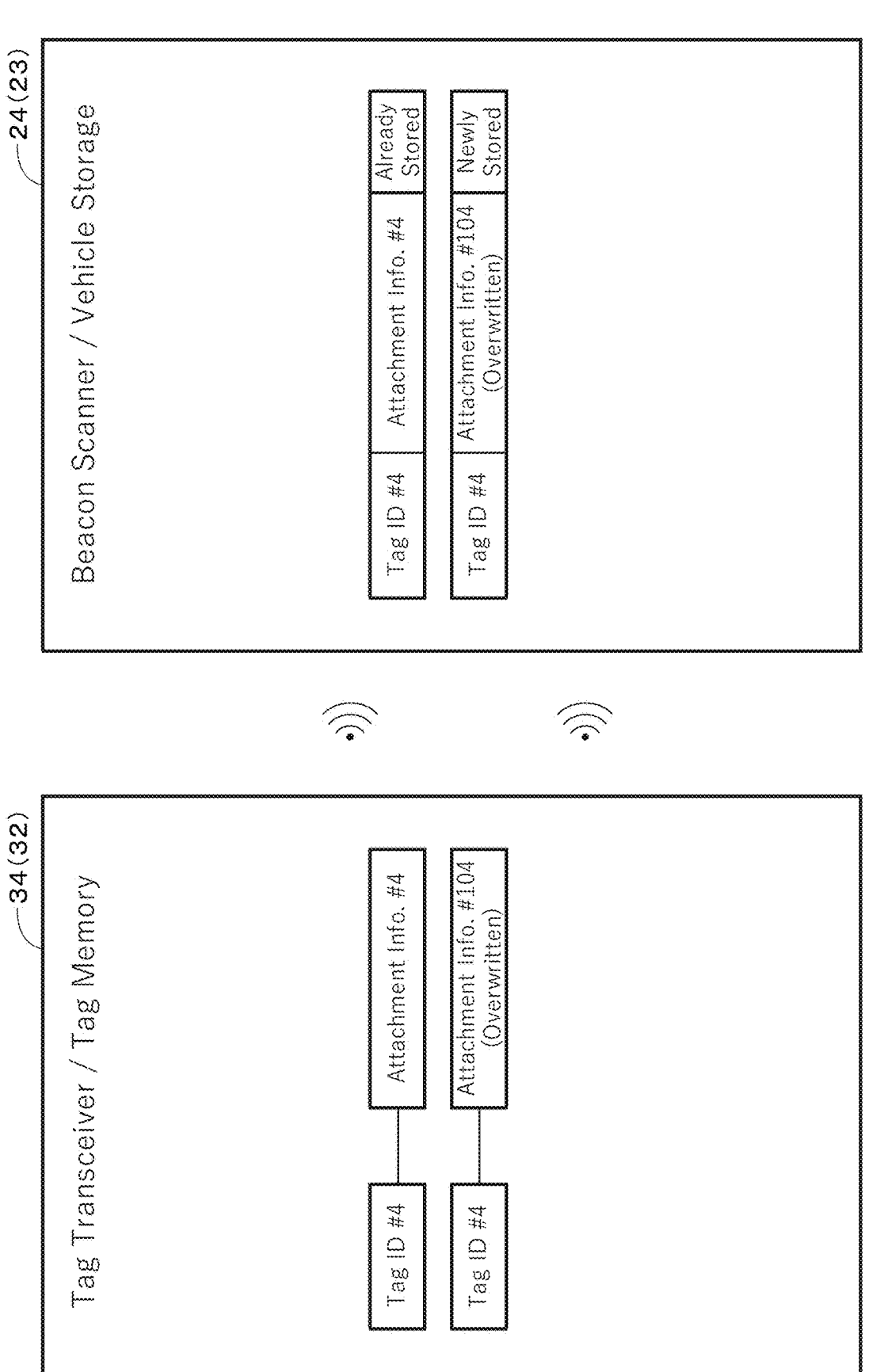

For example, some pieces of combined information in the right column of FIGS. 6B, each containing the tag IDs and pieces of attachment information, (Tag ID #1, Att. Info. #1; Tag ID #2, Att. Info. #2, Tag ID #4; Att. Info. #4, ID #104, Att. Info. #104; Tag ID #5, Att. Info. #5) have already been stored in the vehicle storage 23. When the beacon scanner 24 receives the beacon signal containing the tag ID and the piece of attachment information corresponding to one of pieces of combined information, the vehicle controller 21 determines that both of the tag ID and the piece of attachment information in the beacon signal received by the beacon scanner 24, match with the tag ID and the piece of attachment information stored as combined information in the vehicle storage 23 (in case of "YES" of ST03). In this case, the vehicle controller 21 proceeds to step ST08 without overwriting the piece of attachment information in the vehicle storage 23 and controls the attachment 30 based on the piece of attachment information.

Meanwhile, the tag transceiver 34 transmits the beacon signal containing the tag ID (Tag ID #3) and one piece of attachment information (Att. Info. #3) listed in the left column of FIG. 6C. The vehicle storage 23 has not stored the one piece of combined information (Tag ID #3: Att. Info. #3) corresponding to the tag ID (Tag ID #3) and the one piece of attachment information (Att. Info. #3) in the beacon signal. The vehicle controller 21 determines that both the tag ID (Tag ID #3) and the one piece of attachment information (Att. Info. #3) in the beacon signal are inconsistent with the tag ID and the one piece of attachment information (Tag ID #3: Att. Info. #3) stored as one piece of combined information in the vehicle storage 23 (in case of "NO" of ST03). In step ST05, the vehicle controller 21 controls the vehicle interface 25 to display a first prompt screen (Prompt 1) indicating the tag ID (Tag ID #3, not yet stored) and the one piece of attachment information (Att. Info. #3, not yet stored) in the beacon signal as shown in FIG. 7 (#X=#3, #Y=#3).

The vehicle storage 23 has already stored one piece of combined information (Tag ID #4: Att. Info. #4) as shown in the right column of FIG. 6D. Suppose that the operator uses the mobile terminal 40 to overwrite the one piece of attachment information (Att. Info. #4) stored in the tag memory 32 (Tag ID #4) to another piece of attachment information (Att. Info. #104). The tag transceiver 34 of the tag ID (Tag ID #4) in the left column of FIG. 6D transmits the beacon signal containing the another piece of attachment information (Att. Info. #104). When the beacon scanner 24 receives the beacon signal containing the tag ID (Tag ID #4) and the one piece of attachment information (Att. Info. #104), the vehicle controller 21 determines that the one piece of attachment information (Att. Info. #104) in the beacon signal does not match with the one piece of attachment information (Att. Info. #4) stored in the vehicle storage 23 (in case of "NO" of ST03). In step ST05, the vehicle controller 21 controls the vehicle interface 25 to display the first prompt screen (Prompt 1) indicating the tag ID (Tag ID #4, already stored) and the one piece of attachment information (Att. Info. #104, not yet stored) in the beacon signal as shown in FIG. 7 (#X=#4, #Y=#104).

The vehicle storage 23 has already stored pieces of combined information (Tag ID #4: Att. Info. #4) and (Tag ID #104: Att. Info. #104) as shown in the right column of FIG. 6E. Suppose that the operator physically removes one of the beacon tags 33 (Tag ID #104) from one of the attachments 30 (Att. Info. #104), fixes it to another one of the attachments 30 (Att. Info. #4) and overwrites one piece of attachment information (Att. Info. #104) stored in the tag memory 32 (Tag ID #104) to another piece of attachment information (Att. Info. #4). The tag transceiver 34 of the tag ID (Tag ID #104) in the left column of FIG. 6E transmits the beacon signal containing the one piece of attachment information (Att. Info. #4). When the beacon scanner 24 receives the beacon signal containing the tag ID (Tag ID #104) and the one piece of attachment information (Att. Info. #104), the vehicle controller 21 determines that the tag ID (Tag ID #104) in the beacon signal does not match with the tag ID (Tag ID #4) stored in the vehicle storage 23, or that the one piece of attachment information (Att. Info. #104) in the beacon signal does not match with the one piece of attachment information (Att. Info. #4) stored in the vehicle storage 23 (in case of "NO" of ST03). In any case, the vehicle controller 21 controls the vehicle interface 25, in step ST05, to display the first prompt screen (Prompt 1) indicating the tag ID (Tag ID #104) and the one piece of attachment information (Att. Info. #4) in the beacon signal as shown in FIG. 7 (#X=#104, #Y=#4).

The vehicle storage 23 has already stored one piece of combined information (Tag ID #5: Att. Info. #5) as shown in the right column of FIG. 6F. Suppose that the operator fixes a new beacon tag 33 (Tag ID #105) to the attachment 30 (Att. Info. #5) to replace an old beacon tag 33 (Tag ID #5) with the new one because of failure or malfunction of the old one and stores one piece of original attachment information (Att. Info. #5) in the tag memory 32 of the new one via the mobile terminal 40. The tag transceiver 34 of the tag ID (Tag ID #105) in the left column of FIG. 6F transmits the beacon signal containing the one piece of attachment information (Att. Info. #5). When the beacon scanner 24 receives the beacon signal containing the tag ID (Tag ID #105) and the one piece of attachment information (Att. Info. #5), the vehicle controller 21 determines that the tag ID (Tag ID #105) in the beacon signal does not match with the tag ID (Tag ID #5) stored in the vehicle storage 23 (in case of "NO" of ST03). The vehicle controller 21 controls the vehicle interface 25, in step ST05, to display the first prompt screen (Prompt 1) indicating the tag ID (Tag ID #105) and the one piece of attachment information (Att. Info. #5) in the beacon signal as shown in FIG. 7 (#X=#105, #Y=#5).

In case of "NO" of ST03, the vehicle controller 21 proceeds to step ST04 and controls the notifier 28 to provide the audible and/or visual alarm indicating that either or both of the tag ID and the piece of attachment information in the beacon signal do not meet with ones stored as combined information in the vehicle storage 23.

Next in step ST05, the vehicle controller 21 controls the vehicle interface 25 to display the first prompt screen (Prompt 1). Furthermore, the vehicle controller 21 controls the terminal interface 42 and/or PC interface 66 (user interface UI), through the vehicle communicator 27, the server 50, the terminal communicator 47, and PC communicator 64, to display the first prompt screen (Prompt 1). Specifically, the vehicle controller 21 controls the user interface UI to display a message, including for example, "WARNING!! Tag ID and/or Attachment Information in received Beacon Signal has not been stored. Attachment Information linked to Tag ID in Beacon Signal is Newly Stored. OK?". This inquires approval of the operator to store in the vehicle storage 23, a new piece of combined information of the piece of attachment information linked to the tag ID included in the beacon signal.

In step ST06, when the operator approves the vehicle controller 21 to store in the vehicle storage 23, the new piece of combined information of the piece of attachment information linked to the tag ID, including for example, (Tag ID #3, Att. Info. #3), (Tag ID #4, Att. Info. #104), (Tag ID #104, Att. Info. #104), and (Tag ID #105, Att. Info. #5), which are displayed on the vehicle interface 25 and/or the user interface UI. Specifically, when the operator selects "YES" on the first prompt screen, the vehicle controller 21 accepts operator's approval. When the user interface UI includes a touch panel, the operator may approve the first prompt by tapping an area of the touch panel indicating "YES". In step ST07, the new piece of combined information of the piece of attachment information linked to the tag ID is stored or registered in the vehicle storage 23. In step ST08, the vehicle controller 21 performs the predetermined operation (controls the attachment 30) based on the piece of attachment information newly stored in the vehicle storage 23. The process ends when the operator does not approve storing the new piece of combined information in the vehicle storage 23 in step ST06.

Figure 8:
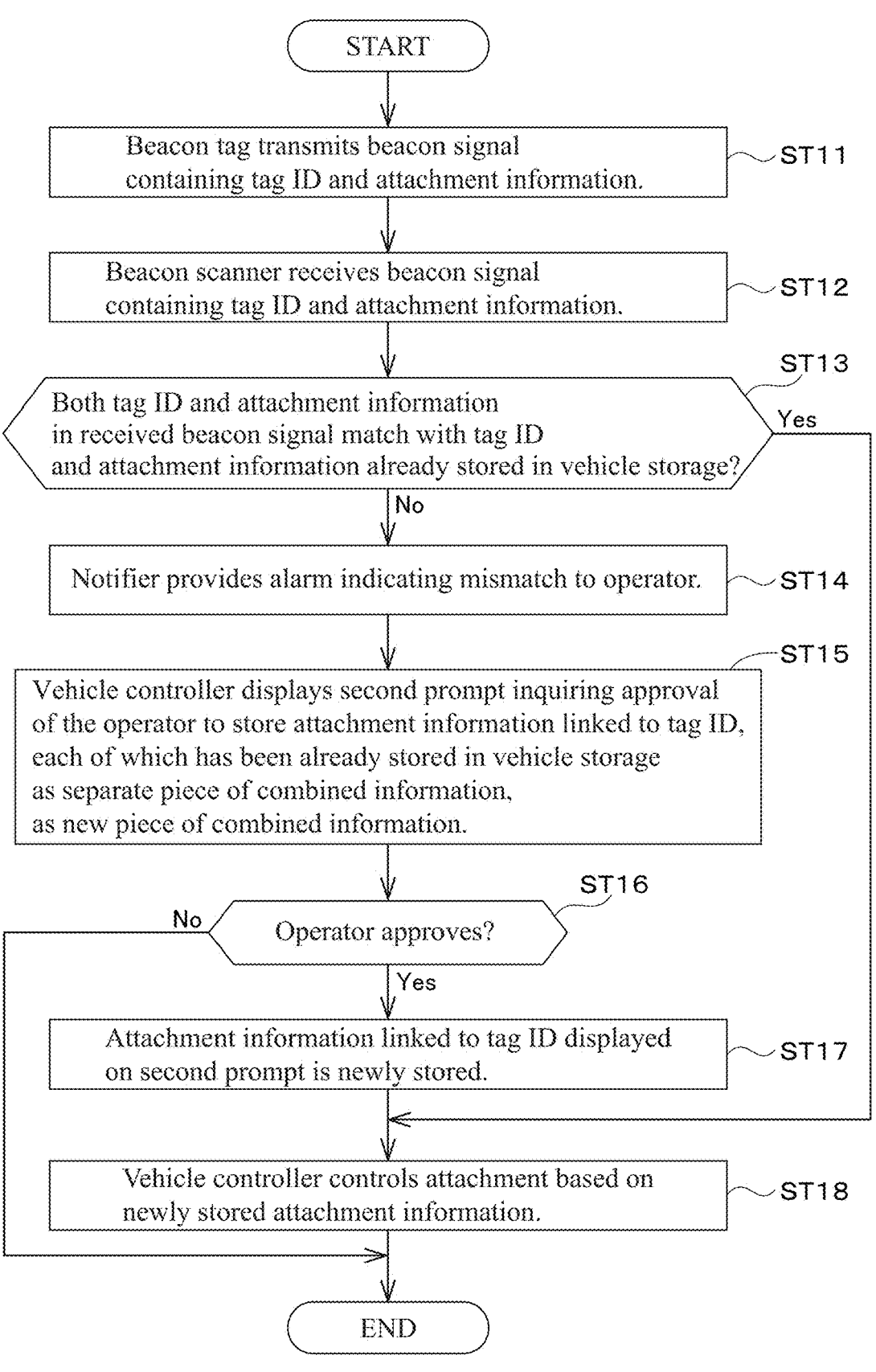
FIG. 8 is another flowchart showing another process according to the example embodiment, which is similar to FIG. 5.

FIG. 8 is a flowchart showing another process of the present example embodiment, similar to FIG. 5, except steps ST15 and ST17. In step ST13, the vehicle controller 21 determines whether both of the tag ID and the piece of attachment information in the beacon signal received by the beacon scanner 24 meet with the tag ID and the piece of attachment information stored as combined information in the vehicle storage 23. When the vehicle controller 21 determines that both of the tag ID and the piece of attachment information in the beacon signal meet with the tag ID and the piece of attachment information already stored as combined information in the vehicle storage 23 (in case of "YES" of ST13), the vehicle controller 21 proceed to step ST18, and performs the predetermined operation (controls the attachment 30) based on the piece of attachment information stored in the vehicle storage 23.

On the other hand, when the vehicle controller 21 determines that either or both of the tag ID and the piece of attachment information in the beacon signal do not meet with the tag ID and the piece of attachment information stored as combined information in the vehicle storage 23 (in case of "NO" of ST13), in step ST14, the vehicle controller 21 controls the notifier 28 to provide the operator with notification of mismatch or inconsistency between the tag ID and the piece of attachment information in the beacon signal and ones stored as combined information.

Figure 6E:
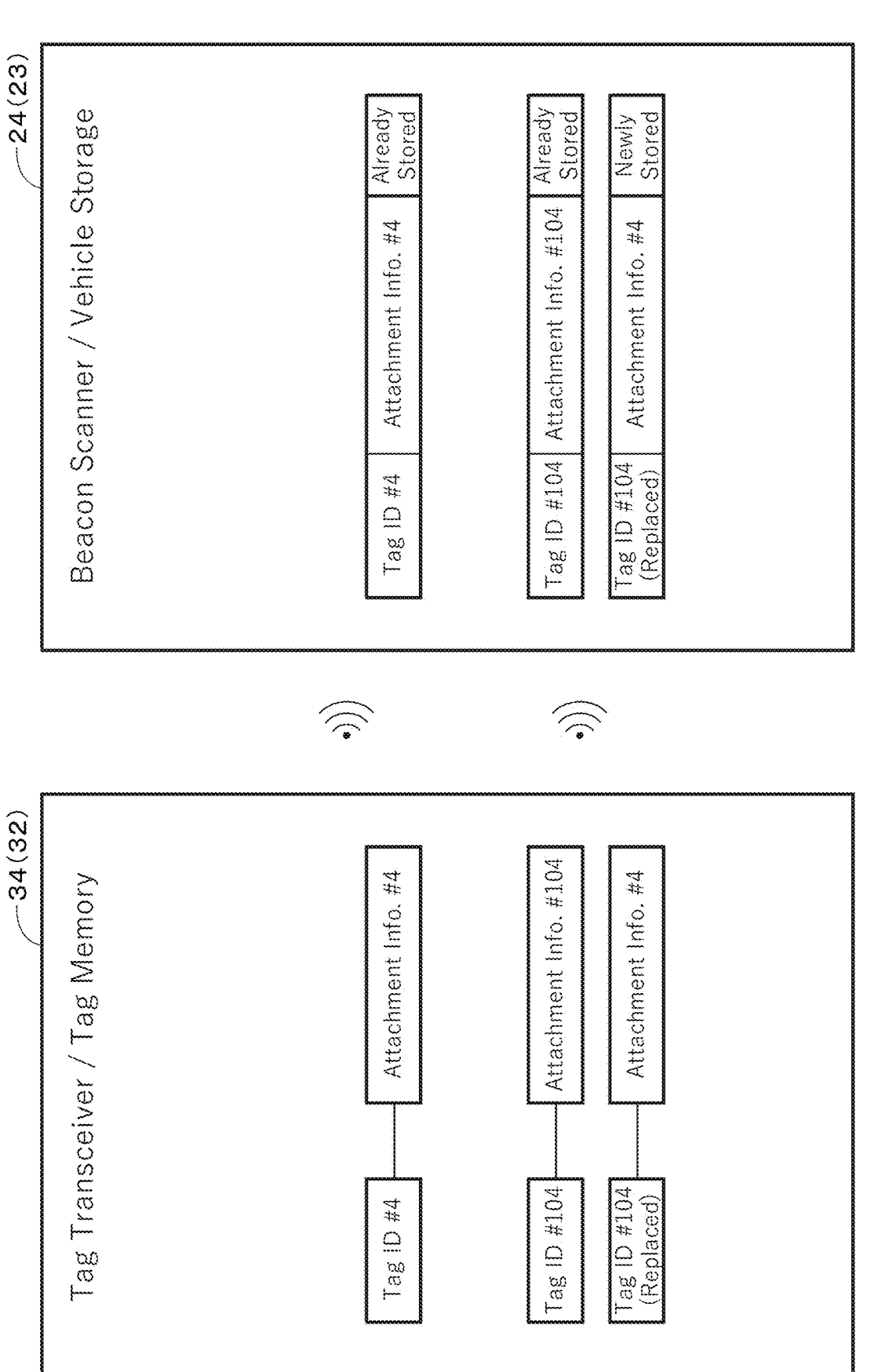
Figure 6F:
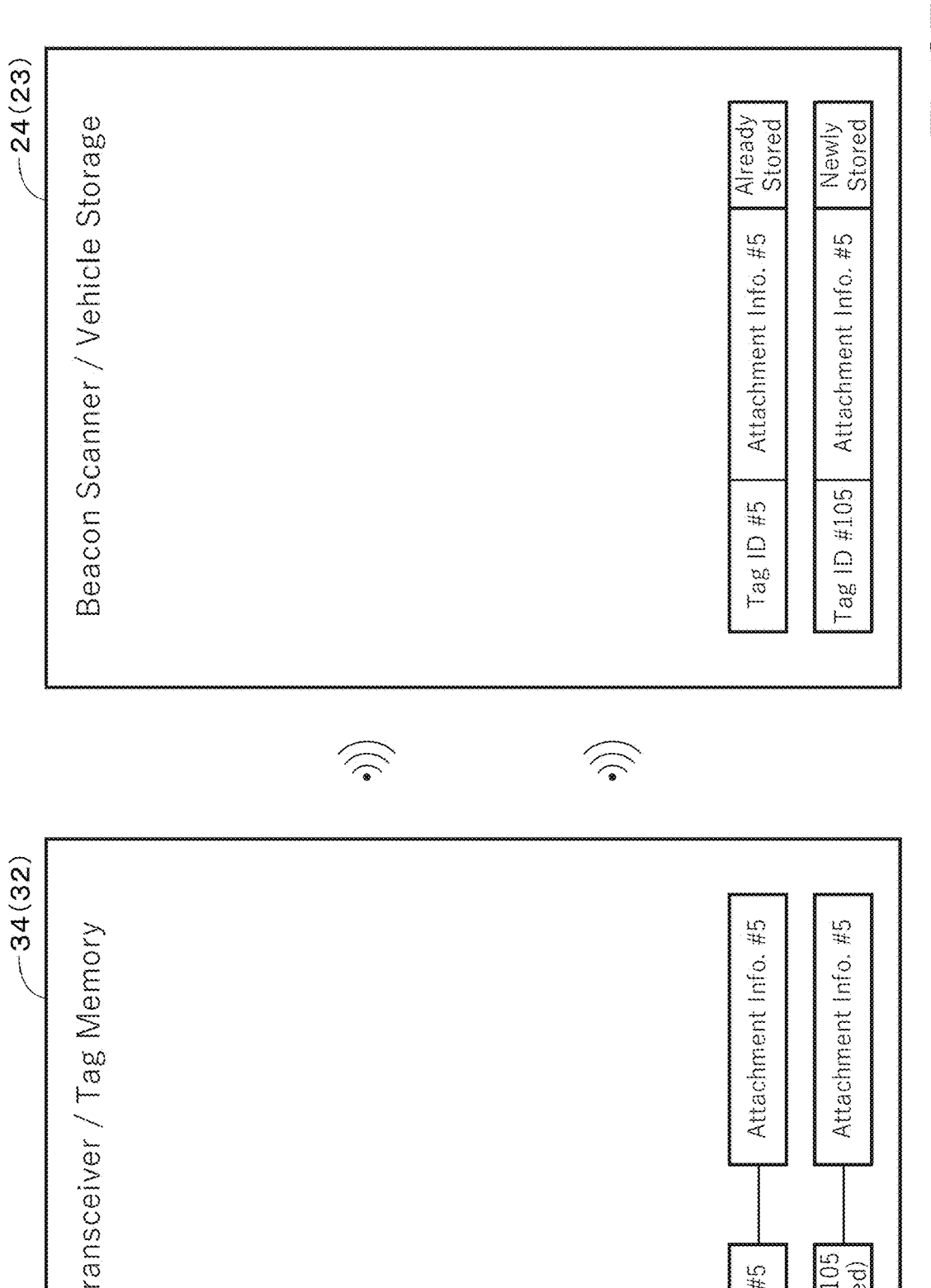

As shown in the right column of FIG. 6E, while the vehicle storage 23 has already stored pieces of combined information containing the tag IDs and the pieces of attachment information (Tag ID #4, Att. Info. #4; Tag ID #104, Att. Info. #104), it has not stored the piece of combined information (Tag ID #4, Att. Info. #104). As describe above, the old beacon tag 33 (Tag ID #4) may be replaced by the new beacon tag 33 (Tag ID #104), and the operator may overwrite one piece of attachment information in the tag memory 32 with another piece of original attachment information (Att. Info. #4) via the mobile terminal 40. Then, the tag transceiver 34 of the new beacon tag 33 transmits the beacon signal containing the tag ID (Tag ID #104) and the piece of attachment information (Att. Info. #4) as shown in the left column of FIG. 6E. When the beacon scanner 24 receives the beacon signal containing the piece of combined information (Tag ID #104, Att. Info. #4) in step ST13, the vehicle controller 21 controls the notifier 28 to provide notification in step ST14. In step ST15, the vehicle controller 21 controls the vehicle interface 25 to display the piece of attachment information (Att. Info. #4) stored as one piece of combined information and the tag ID (Tag ID #104) in the beacon signal on the second prompt screen (Prompt 2) of FIG. 9.

In step ST15, the vehicle controller 21 controls the vehicle interface 25 to display the second prompt screen (Prompt 2) of FIG. 9. The vehicle controller 21 controls the vehicle interface 25 to display a message, including for example, "WARNING!! Tag ID and/or Attachment Information in received Beacon Signal has not been stored. Stored Attachment Information linked to Tag ID in Beacon Signal is Newly Stored. OK?". This inquires approval of the operator to store in the vehicle storage 23, another new piece of combined information of the piece of attachment information linked to the tag ID included in the beacon signal. It should be noted that although the piece of attachment information (Att. Info. #4) has been stored, the stored tag ID (Tag ID #4) corresponding to the piece of attachment information (Att. Info. #4) is different from the stored tag ID (Tag ID #104) corresponding to the same piece of attachment information (Att. Info. #4). In this instance, the vehicle interface 25 may preferably display the tag ID (Tag ID #104) in color or flashing, to call attention of the operator that the beacon tag 33 fixed on the attachment 30 has been interchanged (Tag ID #4 to Tag ID #104).

In step ST16, when operator selects "YES" on the second prompt screen of FIG. 9 so that the vehicle controller 21 accepts operator's approval to store another new piece of combined information (Tag ID #104; Att. Info. #4) in the vehicle storage 23, in step ST17, the vehicle controller 21 controls the vehicle storage 23 to store the piece of attachment information linked to the tag ID in the received beacon signal as the new piece of combined information in the vehicle storage 23. In step ST18, the vehicle controller 21 performs the predetermined operation (controls the attachment 30) based on the newly stored piece of attachment information. The process ends when the operator does not approve storing the new piece of combined information in the vehicle storage 23 in step ST16.

In the meanwhile, the tag transceiver 34 of the beacon tag 33 periodically transmits the beacon signal at a predetermined period, as described above. However, mud and/or other foreign materials may be attached around the beacon tag 33, which may substantially reduce the signal intensity of the beacon signal. Because of this, the beacon scanner 24 of the work vehicle 1 may not receive the beacon signal from the beacon tag 33 in given time exceeding the predetermined period. In this situation, the vehicle controller 21 may keep performing the predetermined operation based on the stored piece of attachment information in the beacon signal which has been received and is stored in the vehicle storage 23.

Attachment information includes unchangeable information and changeable information. Unchangeable information cannot be changed over time, which includes, for example, information relating to the specification such as the attachment ID, model number, maximum permissible flow rate of hydraulic fluid to be supplied to the attachment 30, and/or the like. Changeable information may be changed over time, which includes, for example, an hour meter (cumulative operating time of the work device) and the SOC of the battery 36 of the beacon tag 33, and/or the like. While the vehicle controller 21 is performing the predetermined operation based on the piece of attachment information in the beacon signal, when the beacon scanner 24 does not receive the beacon signal from the tag transceiver 34 in given time exceeding the predetermined period, the vehicle controller 21 may keep controlling the attachment 30 based on unchangeable information of the piece of attachment information but ceases controlling the attachment 30 based on changeable information of the piece of attachment information.

While vehicle controller 21 is performing the predetermined operation based on the piece of attachment information in the beacon signal, when the SOC of the battery 36 of the beacon tag 33 becomes zero so that the beacon signal is not transmitted, the vehicle controller 21 keeps performing the predetermined operation (e.g., controlling the attachment 30) based on the stored piece of attachment information. Note, however, that when the SOC of the battery 36 of the beacon tag 33 becomes zero, the vehicle controller 21 does not display the SOC of the battery 36 on the vehicle interface 25 as the "predetermined operation".

In a case where the vehicle controller 21 has controlled a plurality of the attachments 30 in the past, based on a plurality of pieces of attachment information in the beacon signals received from the tag transceiver 34, the vehicle storage 23 has stored a plurality of combined information containing a plurality of pieces of attachment information each linked to corresponding tag IDs. The vehicle controller 21 may upload the plurality of pieces of attachment information each linked to corresponding tag IDs to the server 50 via the vehicle communicator 27. With this, the server storage 52 is configured to store the plurality of pieces of attachment information each linked to corresponding tag IDs in the server storage 52. Furthermore, the server storage 52 may collect and store the plurality of pieces of attachment information each linked to corresponding tag IDs which have been uploaded from a plurality of work vehicles 1.

When the attachment 30 is attached to the work vehicle 1, the SOC of the of the beacon tag 33 has already been zero, so that the beacon scanner 24 receives no beacon signal from the tag transceiver 34. In this instance, the vehicle controller 21 inquires the operator to select one of the plurality of pieces of attachment information already stored in the vehicle storage 23.

Specifically, the vehicle controller 21 controls the vehicle interface 25 and/or user interface UI to display the third prompt screen (Prompt 3) shown in FIG. 10. The vehicle controller 21 controls the vehicle interface 25 to display a message, including for example, "WARNING!! No Beacon Signal is Received from Beacon Tag. Select one piece of Stored Attachment Information among Following Attachment Information (already stored in the vehicle storage 23)", and a list of a plurality of pieces of attachment information each linked to a plurality of tag IDs stored as a plurality of combined information in the vehicle storage 23. This inquires the operator to select one of the plurality of pieces of attachment information. It should be noted that it is not essential to list the stored tag IDs on the third prompt screen of FIG. 10.

When the operator realizes that the attachment 30 to be coupled to the work vehicle 1 is a bucket listed in the first line (Attachment ID: A #4016), the operator selects the desired piece of stored attachment information (for the bucket listed in the first line) on the third prompt screen. Specifically, when the vehicle interface 25 and/or user interface UI is structured as a touch panel, the operator can select the desired piece of stored attachment information simply by tapping an area of the touch panel indicating the desired piece of stored attachment information. The vehicle interface 25 may display the tapped or selected area in color or flashing. Then, the operator taps or selects the graphic icon of "SELECT" so that the vehicle controller 21 performs the predetermined operation (or controls the attachment 30).

In the meanwhile, the mobile terminal 40 is used to store (newly store or overwrite) one of attachment information in the tag memory 32 of the beacon tag 33. As discussed above, the attachment management system 100 according to the present example embodiment include the mobile terminal 40, which include a terminal interface 42 and a terminal transceiver 44. The beacon tag 33 transmits the beacon signal containing the tag ID unique to the beacon tag 33. The mobile terminal 40 is configured to obtain attachment information containing the attachment ID unique to the attachment 30. The mobile terminal 40 is also configured to transmit the beacon signal containing the particular tag ID and the obtained piece of attachment information. On the other hand, when the beacon tag 33 receives the beacon signal containing its own tag ID, the microcomputer 31 of the beacon tag 33 controls the tag memory 32 to store the piece of attachment information in the beacon signal. With this, the mobile terminal 40 is able to cause the tag memory 32 of the beacon tag 33 to newly store or overwrite the piece of attachment information.

Figure 11:
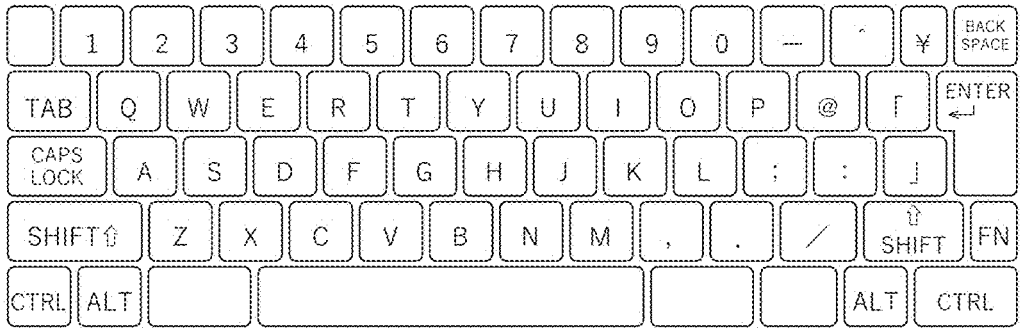
FIG. 11 shows a setting screen displayed on the vehicle interface.

The mobile terminal 40 typically receives a plurality of beacon signals from a plurality of beacon tags 33 on the attachments 30 around the mobile terminal 40. The mobile terminal 40 is configured to control the terminal interface 42 to list the plurality of tag IDs and the received signal strength or RSSI linked to each of the tag IDs on a setting screen as shown in FIG. 11. Since the beacon signals are the wireless signals compliant with the near field communication standard, the received signal strength or RSSI of the beacon signals generally varies depending on distances between the mobile terminal 40 and the beacon tags 33. While the operator holds the mobile terminal 40 and moves around the attachments 30 and/or unused beacon tags 33, the RSSI of the beacon signals from the beacon tags 33 change substantially.

The operator may tap or select one of the beacon tags 33 (tag IDs) on the setting screen of FIG. 11, which is determined as being closest to the operator based on the RSSI, and may input the piece of attachment information corresponding to the selected beacon tag 33 (tag ID) through manual operation on the keyboard of the terminal interface 42. The terminal interface 42 may preferably display the beacon tag 33 (tag ID) selected by the operator in color or flashing. The mobile terminal 40 transmits the beacon signal containing the selected tag ID of the beacon tag 33 and the input or obtained piece of attachment information. When the beacon tag 33 receives the beacon signal containing its own tag ID, the microcomputer of the beacon tag 33 controls the tag memory 32 to newly store or overwrite the piece of attachment information in the beacon signal.

Instead of referring the RSSI to select the beacon tag 33, the mobile terminal 40 may obtain the tag ID by scanning a binary code or image code attached on the beacon tag 33 with a camera 46 of the mobile terminal 40. Alternatively, the mobile terminal 40 may obtain the tag ID by operator's manual input through the keyboard on the setting screen.

Rather than manual operation on the keyboard of the terminal interface 42, the mobile terminal 40 may obtain the piece of attachment information by scanning a binary code or image code attached on the attachment 30 with the camera 46 of the mobile terminal 40, which corresponds to the selected or obtained beacon tag 33 (tag ID).

As described above, the attachment management system according to the present example embodiment includes a server 50 capable of communicating with the terminal communicator 47 of the mobile terminal 40. The piece of attachment information contains the attachment ID unique to each of the attachments 30. When the mobile terminal 40 receives the plurality of beacon signals from the plurality of beacon tags 33, the terminal interface 42 is configured to display the list of the tag IDs each unique to the beacon tags 33 on the setting screen shown in FIG. 11. The operator taps or selects one of tag IDs on the terminal interface 42, and manually input the attachment ID corresponding to the selected one of tag IDs. Since the attachment ID itself typically consists of simple alphanumeric characters, manual input of the attachment ID on the setting screen is less complicated, when compared with the case to manually input all items of attachment information. As above, the server storage 52 of the sever 50 is configured to collect and store the plurality of pieces of attachment information each linked to corresponding tag IDs which have been uploaded from a plurality of work vehicles 1. The mobile terminal 40 is configured to obtain the piece of attachment information by communicating with the server 50 through the terminal communicator 47, based on the input attachment ID. Furthermore, the mobile terminal 40 may transmit the beacon signal containing the selected tag ID and the obtained piece of attachment information, from the terminal transceiver 44 to the tag transceiver 34, to cause the tag memory 32 to store the obtained piece of attachment information.

When the vehicle controller 21 determines that the piece of attachment information corresponding to the tag ID in the beacon signal meets with the stored piece of attachment information corresponding to the stored tag ID stored as combined information, the vehicle controller 21 may performs the predetermined operation (control the attachment 30) based on the stored piece of attachment information stored as combined information.

On the other hand, when the vehicle controller 21 determines that the piece of attachment information corresponding to the tag ID in the beacon signal does not meet with the stored piece of attachment information corresponding to the stored tag ID stored as combined information, the vehicle controller 21 may control the vehicle storage 23 to store the tag ID and the piece of attachment information in the beacon signal as a new piece of combined information, and perform the predetermined operation (control the attachment 30) based on the new piece of attachment information stored as the new piece of combined information.

In the above description, the vehicle controller 21 stores the new piece of combined information containing the tag ID and the piece of attachment information at the time when the operator selects the attachment 30 to be attached to the work vehicle 1, and performs the predetermined operation based on the newly stored piece of attachment information. However, it is not limited thereto, the vehicle controller 21 may store the new piece of combined information containing the tag ID and the piece of attachment information at the time when and/or after the operator selects the attachment 30 to be attached to the work vehicle 1, and performs the predetermined operation based on the newly stored piece of attachment information. For example, after the operator selects the attachment 30 to be attached to the work vehicle 1, and the vehicle controller 21 confirms that the attachment 30 is actually attached to the work vehicle 1 via the quick hitch 16, then the vehicle controller 21 may store the new piece of combined information containing the tag ID and the piece of attachment information, and perform the predetermined operation based on the newly stored piece of attachment information.

For example, the beacon tag 33 may have an oscillation sensor or acceleration sensor 48. After the attachment 30 is actually attached to the work vehicle 1, the oscillation sensor 48 outputs an oscillating signal when the beacon tag 33 vibrates or oscillates together with the attachment 30. The beacon signal may contain the oscillating data as one of attribute information. The beacon scanner 24 of the work vehicle 1 receives the beacon signal containing the oscillating data. The vehicle controller 21 of the work vehicle 1 may store the new piece of combined information containing the tag ID and the piece of attachment information, and perform the predetermined operation based on the newly stored piece of attachment information, after the attachment 30 is securely attached to the work vehicle 1 and the beacon scanner 24 surely receives the oscillating data indicating that the beacon tag 33 on the attachment 30 vibrates or oscillates with the attachment 30.

The vehicle controller 21 may store the new piece of combined information containing the tag ID and the piece of attachment information as the new piece of combined information and perform the predetermined operation based on the piece of attachment information at the time when and/or after one of the plurality of attachments 30 is selected. Specifically, after one of the plurality of attachments 30 is selected, the vehicle controller 21 is configured to determine that the beacon tag 33 attached to the selected attachment 30 is replaced or interchanged with another one, when the piece of attachment information corresponding to the tag ID in the beacon signal received from the tag transceiver 34 of the beacon tag 33, to which the selected attachment 30 is fixed, does not meet with the piece of attachment information corresponding to the tag ID stored as the plurality of combined information in the vehicle storage 23. When the vehicle controller 21 determines that the beacon tag 33 is replaced or interchanged with another one, the vehicle controller 21 may control the vehicle storage 23 to store the new piece of combined information containing the tag ID and the piece of attachment information in the beacon signal, and perform the predetermined operation based on the stored piece of attachment information in the new piece of combined information.

As described with reference to FIG. 11, the vehicle controller 21 may determine that one of attachments 30 with the beacon tag 33 fixed thereon is selected, which transmits the beacon signal including the RSSI highest among the beacon signals that the beacon scanner 24 receives from the plurality of the beacon tags 33.

The vehicle controller 21 may sort and display on the user interface UI, the plurality of pieces of attachment information in the beacon signals transmitted from the tag transceivers 34 each fixed on the respective attachments 30 around the work vehicle 1, in descending order based on the RSSI of the beacon signals. The user interface UI includes the terminal interface 42 and PC interface, as well as the vehicle interface 25.

Furthermore, the vehicle controller 21 may control the user interface UI to display the fourth prompt (Prompt 4) as shown in FIG. 12, providing a message, including for example, "Caution!! Some Beacon Signals are Received from Some of Beacon Tags. Select one piece of Attachment Information in Received Beacon Signals among Following Attachment Information." together with a list of the plurality of tag IDs and pieces of attachment information in the plurality of beacon signals. This inquires the operator to select one of the plurality of pieces of attachment information in the beacon signals received by the beacon scanner 24. When the operator taps on an area indicating particular attachment information, and taps on an icon of "SELECT", the vehicle controller 21 determines that the operator selects a particular attachment 30 (attachment information) to respond to the fourth prompt.

When either or both of the piece of attachment information and the tag ID corresponding thereto selected by the operator to the fourth prompt does not match with the piece of attachment information and the tag ID stored as the piece of combined information in the vehicle storage 23, the vehicle controller 21 provides the alarm to the operator via the notifier 28, similarly to the example embodiments as discussed above.

Specifically, when either or both of the piece of attachment information and the tag ID corresponding thereto selected by the operator to the fourth prompt does not match with the piece of attachment information and the tag ID stored as the piece of combined information in the vehicle storage 23, the vehicle controller 21 may control the user interface UI to display the first prompt as shown in FIG. 7.

Furthermore, when the piece of attachment information and the tag ID corresponding thereto selected by the operator to the fourth prompt does not match with the piece of attachment information and the tag ID stored as the piece of combined information in the vehicle storage 23, the vehicle controller 21 may control the user interface UI to display the second prompt as shown in FIG. 9.

After the user interface UI accepts the operator's approval to the first or second prompt, the vehicle controller 21 controls the vehicle storage 23 to store the tag ID and the piece of attachment information in the beacon signal as a new piece of combined information, and performs the predetermined operation (controls the attachment 30) based on the newly stored piece of attachment information.

While the tag transceiver 34 of the beacon tag 33 periodically transmits the beacon signal at a predetermined period, the beacon scanner 24 of the work vehicle 1 may not receive the beacon signal from the beacon tag 33 in given time exceeding the predetermined period. In this situation, the vehicle controller 21 may keep performing the predetermined operation based on the piece of attachment information stored as the piece of combined information in the vehicle storage 23.

The vehicle controller 21 may keep performing the predetermined operation based on unchangeable information of the stored piece of attachment information, which cannot be changed over time, but may cease controlling the attachment 30 based on changeable information which can be changed over time of the stored piece of attachment information, which can be changed over time. Furthermore, while the vehicle controller 21 is performing the predetermined operation based on the piece of attachment information in the beacon signal the vehicle controller 21 may keep performing the predetermined operation based on the stored piece of attachment information, even after the beacon signal is interrupted.

As described above, the mobile terminal 40 includes the terminal interface 42 (touch panel) and the terminal transceiver 44. After the piece of attachment information may be obtained through the terminal interface 42, it is transmitted from the terminal transceiver 44 to the tag transceiver 34, and then stored in the tag memory 32 of the beacon tag 33. The terminal interface 42 may be configured to allow the operator to select one piece of attachment information among the plurality of pieces of attachment information, and/or allow the operator to input one piece of attachment information through direct manual operation of the operator.

The mobile terminal 40 may be configured to receive the beacon signal from at least one beacon tag 33 to obtain the tag ID thereof, obtain through the terminal interface 42, the piece of attachment information corresponding to the tag ID of the at least one beacon tag 33, and transmit the beacon signal from the terminal transceiver 44 to the tag transceiver 34 of the at least one beacon tag 33, which contains the tag ID and the obtained piece of attachment information of the at least one beacon tag 33.

More specifically, the mobile terminal 40 may include a camera 46, and the at least one beacon tag 33 may have an attached image code recording the tag ID thereof. The mobile terminal 40 may be configured to obtain the tag ID thereof by scanning the image code. The mobile terminal 40 may also be configured to obtain the piece of attachment information corresponding to the tag ID of the at least one beacon tag 33. Furthermore, the mobile terminal 40 may transmit the beacon signal containing the tag ID and the obtained piece of attachment information of the at least one beacon tag 33, from the terminal transceiver 44 to the tag transceiver 34 of the at least one beacon tag 33, to cause the tag memory 32 of the at least one beacon tag 33 to store the obtained piece of attachment information.

The mobile terminal 40 may include the terminal interface 42 and the terminal transceiver 44, and the server 50 can communicate with the terminal communicator 47. The piece of attachment information includes the attachment ID unique to the attachment 30. The mobile terminal 40 may obtain the piece of attachment information by communicating with the server 50 through the terminal communicator 47, based on the piece of attachment ID which is input by the operator through the terminal interface 42, and transmit the beacon signal containing the tag ID and the obtained piece of attachment information of the beacon tag 33, from the terminal transceiver 44 to the tag transceiver 34, to cause the tag memory 32 to store the obtained piece of attachment information.

Alternatively, the mobile terminal 40 may be configured, when receiving the plurality of beacon signals from the plurality of beacon tags 33, to display on the terminal interface 42, the plurality of tag IDs and pieces of attachment information in the beacon signals of plurality of the beacon tags 33. As described above with reference to FIG. 11, the mobile terminal 40 may be configured to allow the operator to select one of the tag IDs displayed on the terminal interface 42, and to input the attachment ID corresponding to the selected one of the tag IDs through the terminal interface 42. The mobile terminal 40 may be configured to communicate with the server 50 via the terminal communicator 47 to obtain the piece of attachment information based on the attachment ID, from the server storage 52 of the server 50. The mobile terminal 40 may be configured to transmit the beacon signal containing the selected tag ID and the obtained piece of attachment information of the beacon tag 33, from the terminal transceiver 44 to the tag transceiver 34 of the beacon tag 33, to cause the tag memory 32 thereof to store the obtained piece of attachment information.

Each of the pieces of attachment information may include, for example, information indicating a name and specification of the and a specification of the attachment 30, information indicating the rated flowrate of hydraulic operation fluid from the work vehicle to the attachment 30, information indicating an operating time of the attachment 30, and information indicating a state of capacity of the tag battery 36 that supplies power to the tag memory 32 and the tag transceiver 34 of the beacon tag 33.

The user interface UI may include, for example, the vehicle interface 25 provided on the work vehicle 1, the PC interface 66 provided on the external terminal 60 capable of communicating with the server 50, and the terminal interface 42 provided on the mobile terminal 40 capable of communicating with the server 50.

Example embodiments of the present invention provide attachment management systems, as described in the following items.

(Item 1) An attachment management system 100 including a work vehicle 1 including a vehicle storage 23, a vehicle receiver 24 (beacon scanner 24), and a vehicle controller 21; an attachment 30 detachably coupled to the work vehicle 1; and at least one communication tag 33 (beacon tag 33) interchangeably fixed to the attachment 30, including a tag transceiver 34 to communicate with the vehicle receiver 24 through a beacon signal that is compliant with a near field communication standard, and a tag memory 32 to store a tag identifier (tag ID) unique to the at least one communication tag 33 and attachment information unique to the attachment 30, to which the at least one communication tag 33 is fixed; wherein the vehicle storage 23 is operable to store at least one piece of combined information including the tag identifier (tag ID) and attachment information linked thereto, the at least one piece of combined information obtained through the beacon signal which the vehicle receiver 24 has received from the tag transceiver 34 of the at least one communication tag 33, and the vehicle controller 21 is configured or programmed to, when at least either one of the tag identifier (tag ID) and attachment information in the beacon signal which the vehicle receiver 24 is receiving from the tag transceiver 34, does not match with the tag identifier (tag ID) and attachment information stored in the vehicle storage 23 as the at least one piece of combined information, control the vehicle storage 23 to store a new piece of combined information including the tag identifier (tag ID) and attachment information linked thereto in the beacon signal which the vehicle receiver 24 is receiving from the tag transceiver 34, and perform a predetermined operation based on attachment information of the new piece of combined information.

According to the attachment management system 100 recited in Item 1, when either or both of the tag identifier (tag ID) and attachment information in the beacon signal which the vehicle receiver 24 is receiving from the tag transceiver 34, does not match with the tag identifier (tag ID) and attachment information stored in the vehicle storage 23 as the at least one piece of combined information, the vehicle controller 21 can control the vehicle storage 23 to store a new piece of combined information including the tag identifier (tag ID) and attachment information linked thereto in the beacon signal which the vehicle receiver 24 is receiving from the tag transceiver 34, and perform the predetermined operation based on attachment information of the new piece of combined information.

(Item 2) The attachment management system 100 recited in Item 1, further including a notifier 28 to provide notification, wherein the vehicle controller 21 is configured or programmed to control the notifier 28 to provide an alarm before controlling the vehicle storage 23 to store the new piece of combined information. According to the attachment management system 100 recited in Item 2, the vehicle controller 21 can control the notifier 28 to provide the alarm before controlling the vehicle storage 23 to store the new piece of combined information.

(Item 3) The attachment management system 100 recited in Item 1 or 2, further including a notifier 28 to provide notification, wherein the vehicle controller 21 is configured or programmed to control the notifier 28 to provide an alarm before performing the predetermined operation based on attachment information of the new piece of combined information. According to the attachment management system 100 recited in Item 3, the vehicle controller 21 can control the notifier 28 to provide an alarm before performing the predetermined operation based on attachment information of the new piece of combined information.

(Item 4) The attachment management system 100 recited in any one of Items 1 to 3, further including a user interface UI, wherein the vehicle controller 21 is configured or programmed to, provide on the user interface UI, a first prompt (Prompt 1) inquiring about whether to store in the vehicle storage 23, the tag identifier (tag ID) and attachment information linked thereto in the beacon signal which the vehicle receiver 24 is receiving from the tag transceiver 34, as the new piece of combined information, before controlling the vehicle storage 23 to store the new piece of combined information, and control the vehicle storage 23 to store the tag identifier (tag ID) and attachment information linked thereto in the beacon signal, as the new piece of combined information, after receiving approval of an operator to the first prompt. According to the attachment management system 100 recited in Item 4, the vehicle controller 21 can provide to an operator a first prompt (Prompt 1) inquiring about whether to store in the vehicle storage 23, the tag identifier (tag ID) and attachment information linked thereto in the beacon signal which the vehicle receiver 24 is receiving from the tag transceiver 34, as the new piece of combined information, before controlling the vehicle storage 23 to store the new piece of combined information.

(Item 5) The attachment management system 100 recited in any one of Items 1 to 4, further including a user interface UI, wherein the vehicle controller 21 is configured or programmed to, when at least either one of the tag identifier (tag ID) and attachment information in the beacon signal which the vehicle receiver 24 is receiving from the tag transceiver 34, does not match with the tag identifier (tag ID) and attachment information stored in the vehicle storage 23 as the at least one piece of combined information, provide on the user interface UI, the tag identifier (tag ID) and attachment information stored in the vehicle storage 23 as the at least one piece of combined information, and a second prompt (Prompt 2) inquiring about whether to perform the predetermined operation based on the tag identifier (tag ID) and attachment information stored in the vehicle storage 23 as the at least one piece of combined information, and perform the predetermined operation based on attachment information stored in the vehicle storage 23 as the at least one piece of combined information, after receiving approval of an operator to the second prompt. According to the attachment management system 100 recited in Item 5, the vehicle controller 21 can provide to the operator, the tag identifier (tag ID) and attachment information in the beacon signal which the vehicle receiver 24 is receiving from the tag transceiver 34, and inquire about whether to perform the predetermined operation based on the tag identifier and attachment information stored in the vehicle storage 23, when either or both of the tag identifier (tag ID) and attachment information does not match with the tag identifier (tag ID) and attachment information stored in the vehicle storage 23 as the at least one piece of combined information.

(Item 6) The attachment management system 100 recited in any one of Items 1 to 5, wherein the tag transceiver 34 is operable to periodically transmit the beacon signal at a predetermined period, the vehicle controller 21 is configured or programmed to perform the predetermined operation based on attachment information stored in the vehicle storage 23 as the at least one piece of combined information, when the vehicle receiver 24 does not receive the beacon signal from the tag transceiver 34 in a predetermined time interval exceeding the predetermined period. According to the attachment management system 100 recited in Item 6, when the vehicle receiver 24 does not receive the beacon signal from the tag transceiver 34 in the predetermined time interval exceeding the predetermined period, the vehicle controller 21 can perform the predetermined operation based on attachment information stored in the vehicle storage 23 as the at least one piece of combined information.

(Item 7) The attachment management system 100 recited in Item 6, wherein attachment information includes unchangeable information that is not changeable over time, and changeable information that is changeable over time, the vehicle controller 21 is configured or programmed, when the vehicle receiver 24 does not receive the beacon signal from the tag transceiver 34 in the predetermined time interval exceeding the predetermined period, while performing the predetermined operation based on attachment information in the beacon signal received from the tag transceiver 34, to maintain performing the predetermined operation based on unchangeable information of attachment information stored in the vehicle storage 23 as the at least one piece of combined information, and not to perform the predetermined operation based on changeable information of attachment information stored in the vehicle storage 23 as the at least one piece of combined information. According to the attachment management system 100 recited in Item 7, the vehicle controller 21 can maintain performing the predetermined operation depending on whether attachment information is unchangeable information or changeable information.

(Item 8) The attachment management system 100 recited in any one of Items 1 to 7, wherein the vehicle controller 21 is configured or programmed to maintain performing the predetermined operation based on attachment information stored in the vehicle storage 23 as the at least one piece of combined information, when the beacon signal is interrupted while the vehicle controller 21 performs the predetermined operation based on attachment information. According to the attachment management system 100 recited in Item 8, the vehicle controller 21 can maintain performing the predetermined operation based on attachment information, when the beacon signal is interrupted while the vehicle controller 21 performs the predetermined operation based on attachment information.

(Item 9) The attachment management system 100 recited in any one of Items 1 to 8, further including a user interface UI, wherein the at least one communication tag 33 includes a plurality of communication tags 33, the vehicle storage 23 stores a plurality of pieces of combined information each including the tag identifiers (tag IDs) and a plurality of pieces of attachment information linked to one of the tag identifiers (tag IDs) in the beacon signals which the vehicle receiver 24 has received from the tag transceivers 34 of the plurality of communication tags 33, and the vehicle controller 21 is configured or programmed to, when the vehicle receiver 24 does not receive the beacon signals from the tag transceivers 34 of the plurality of communication tags 33, provide on the user interface UI, a third prompt (Prompt 3) inquiring about which one of the plurality of pieces of attachment information stored in the vehicle storage 23 as the plurality of pieces of combined information is to be selected, and perform the predetermined operation based on the one of the plurality of pieces of attachment information selected by an operator to the third prompt. According to the attachment management system 100 recited in Item 9, when the vehicle receiver 24 does not receive the beacon signals from the tag transceivers 34, the vehicle controller 21 can select one piece of attachment information stored in the vehicle storage 23 of one piece of combined information stored in the vehicle storage 23, and perform the predetermined operation based on the one piece of attachment information.

(Item 10) The attachment management system 100 recited in any one of Items 1 to 9, further including a mobile terminal 40 including a terminal interface 42 and a terminal transceiver 44, wherein the mobile terminal 40 is configured or programmed to obtain attachment information through the terminal interface 42, and transmit attachment information from the terminal transceiver 44 to the tag transceiver 34, to cause the tag memory 32 to store attachment information. According to the attachment management system 100 recited in Item 10, the mobile terminal 40 can obtain attachment information through the terminal interface 42, and transmit attachment information from the terminal transceiver 44 to the tag transceiver 34, to cause the tag memory 32 to store attachment information.

(Item 11) The attachment management system 100 recited in any one of Items 1 to 10, wherein the terminal interface 42 is configured or programmed to allow an operator to select attachment information, and transmit attachment information selected by the operator, from the terminal transceiver 44 to the tag transceiver 34. According to the attachment management system 100 recited in Item 11, the operator can select attachment information, and selected attachment information can be transmitted from the terminal transceiver 44 to the tag transceiver 34.

(Item 12) The attachment management system 100 recited in Item any one of Items 1 to 11, wherein the terminal interface 42 is configured or programmed to allow an operator to input attachment information, and transmit attachment information input by the operator, from the terminal transceiver 44 to the tag transceiver 34. According to the attachment management system 100 recited in Item 12, the operator can input attachment information through the terminal interface 42, which can be transmitted from the terminal transceiver 44 to the tag transceiver 34.

(Item 13) The attachment management system 100 recited in any one of Items 1 to 12, wherein the terminal interface 42 is configured or programmed to obtain the tag identifier (tag ID) of the at least one communication tag 33, and transmit attachment information obtained through the terminal interface 42, from the terminal transceiver 44 to the tag transceiver 34 corresponding to the tag identifier (tag ID). According to the attachment management system 100 recited in Item 13, the mobile terminal 40 can obtain the tag identifier (tag ID) of the communication tag 33, and transmit the obtained beacon signal containing the tag identifier (tag ID) and obtained attachment information to the tag transceiver 34.

(Item 14) The attachment management system 100 recited in Item 13, wherein the terminal interface 42 is configured or programmed to obtain the tag identifier (tag ID) of the at least one communication tag 33 in the beacon signal received by the terminal transceiver 44 from the tag transceiver 34, and transmit attachment information obtained through the terminal interface 42, from the terminal transceiver 44 to the tag transceiver 34 corresponding to the tag identifier (tag ID). According to the attachment management system 100 recited in Item 14, the mobile terminal 40 can obtain the tag identifier (tag ID) of the communication tag 33, and transmit obtained attachment information to the tag transceiver 34.

(Item 15) The attachment management system 100 recited in Item 13 or 14, wherein the mobile terminal 40 includes a camera 46, the at least one communication tag 33 includes an image code recording the tag identifier (tag ID) of the at least one communication tag 33, and the mobile terminal 40 is configured or programmed to obtain the tag identifier (tag ID) of the at least one communication tag 33, by scanning the image code with the camera 46, and transmit attachment information obtained through the terminal interface 42, from the terminal transceiver 44 to the tag transceiver 34 corresponding to the tag identifier (tag ID). According to the attachment management system 100 recited in Item 15, the mobile terminal 40 can obtain the tag identifier (tag ID) of the communication tag 33, by scanning the image code with the camera 46, and transmit attachment information from the terminal transceiver 44 to the tag transceiver 34.

(Item 16) The attachment management system 100 recited in any one of Items 1 to 15, further including a mobile terminal 40 including a terminal interface 42 and a terminal transceiver 44; and a server 50 capable of communicating with the terminal communicator of the mobile terminal 40, wherein the mobile terminal 40 is configured or programmed to obtain attachment information by communicating with the server 50, based on an attachment identifier (attachment ID) unique to the attachment 30, which is input or selected through the terminal interface 42, obtain attachment information by communicating with the server 50, based on the attachment identifier (attachment ID) input through the terminal interface 42, and transmit obtained attachment information from the terminal transceiver 44 to the tag transceiver 34 corresponding to the tag identifier (tag ID), to cause the tag memory 32 to store attachment information. According to the attachment management system 100 recited in Item 16, the mobile terminal 40 can obtain attachment information based on the attachment identifier (attachment ID) input through the terminal interface 42, and transmit obtained attachment information from the terminal transceiver 44 to the tag transceiver 34.

(Item 17) The attachment management system 100 recited in any one of Items 1 to 16, further including a mobile terminal 40 including a terminal interface 42 and a terminal transceiver 44; and a server 50 capable of communicating with the mobile terminal 40, wherein the at least one communication tag 33 includes a plurality of communication tags 33, the mobile terminal 40 is configured or programmed to, when received the beacon signals from the plurality of communication tags 33, display on the terminal interface 42, the tag identifiers (tag IDs) in the beacon signals received from the plurality of communication tags 33, allow an operator to select one of the tag identifiers (tag IDs) in the beacon signals displayed on the terminal interface 42, and to input an attachment identifier (attachment ID) unique to the attachment 30 through the terminal interface 42, obtain attachment information from the server 50 by communicating with the server 50 based on the attachment identifier (attachment ID) selected by the operator, and transmit the beacon signal containing attachment information, from the terminal transceiver 44 to the tag transceiver 34, to cause the tag memory 32 to store attachment information. According to the attachment management system 100 recited in Item 17, the mobile terminal 40 can display on the terminal interface 42, the tag identifiers (tag IDs) in the beacon signals received from the plurality of communication tags 33, the operator can select one of the tag identifiers (tag IDs) and input the attachment identifier (attachment ID). The mobile terminal 40 can obtain attachment information from the server 50 by communicating with the server 50 based on the selected attachment identifier (attachment ID).

(Item 18) The attachment management system 100 recited in any one of Items 1 to 17, wherein the vehicle controller 21 is configured or programmed to perform the predetermined operation based on attachment information stored in the vehicle storage 23 as the at least one piece of combined information, when attachment information corresponding to the tag identifier (tag ID) in the beacon signal matches with attachment information corresponding to the tag identifier (tag ID) stored in the vehicle storage 23 as the at least one piece of combined information. According to the attachment management system 100 recited in Item 18, when attachment information corresponding to the tag identifier (tag ID) in the beacon signal matches with attachment information corresponding to the tag identifier (tag ID) stored in the vehicle storage 23 as the at least one piece of combined information, the vehicle controller 21 can perform the predetermined operation based on attachment information stored in the vehicle storage 23 as the at least one piece of combined information, without controlling the vehicle storage 23 to store a new piece of combined information.

(Item 19) The attachment management system 100 recited in any one of Items 1 to 18, wherein the vehicle controller 21 is configured or programmed to, when attachment information corresponding to the tag identifier (tag ID) included in the beacon signal does not match with attachment information corresponding to the tag identifier (tag ID) stored in the vehicle storage 23 as the at least one piece of combined information, store a new piece of combined information containing the tag identifier (tag ID) and attachment information linked thereto in the beacon signal which the vehicle receiver 24 is receiving from the tag transceiver 34, and perform a predetermined operation based on attachment information of the new piece of combined information. According to the attachment management system 100 recited in Item 19, when attachment information in the beacon signal does not match with attachment information stored in the vehicle storage 23, the vehicle controller 21 can store the new piece of combined information.

(Item 20) An attachment management system 100 including a work vehicle 1 including a vehicle storage 23, a vehicle receiver 24, and a vehicle controller 21; a plurality of attachments 30 (30-1, 30-2, . . . , 30-N) each detachably coupled to the work vehicle 1; and a plurality of communication tags 33, each of which is interchangeably fixed to one of the plurality of attachments 30 (30-1, 30-2, . . . , 30-N), and includes a tag transceiver 34 to communicate with the vehicle receiver 24 through a beacon signal that is compliant with a near field communication standard, and a tag memory 32 to store a piece of combined information including a tag identifier (tag ID) unique to one of the plurality of communication tags 33 and attachment information unique to one of the plurality of attachments 30 (30-1, 30-2, . . . , 30-N), to which the one of the plurality of communication tags 33 is fixed, wherein the vehicle storage 23 stores a plurality of pieces of combined information, each of which includes one of the tag identifiers and one piece of attachment information linked thereto, the plurality of pieces of combined information obtained through the beacon signals which the vehicle receiver 24 has received from the tag transceivers 34 of the plurality of communication tags 33, and the vehicle controller 21 is configured or programmed to, at a timing when or after one of the plurality of attachments 30 (30-1, 30-2, . . . , 30-N) is selected, determine that one of the plurality of communication tags 33 fixed on one of the plurality of attachments 30 (30-1, 30-2, . . . , 30-N) is changed to another of the plurality of communication tags 33, when the one piece of attachment information linked to one of the tag identifiers, which are obtained through one of the beacon signals received by the vehicle receiver 24, does not match with another piece of attachment information linked to the one of tag identifiers stored in the vehicle storage 23 as one of the plurality of pieces of combined information, control the vehicle storage 23 to store a new piece of combined information containing the one of the tag identifiers and the one piece of attachment information linked thereto, in one of the beacon signals which the vehicle receiver 24 is receiving from one of the tag transceivers 34 of the plurality of communication tags 33, and perform a predetermined operation based on the one piece of attachment information of the new piece of combined information. According to the attachment management system 100 recited in Item 20, at a timing when or after one of the plurality of attachments 30 (30-1, 30-2, . . . , 30-N) is selected, the vehicle controller 21 can determine that one of the communication tags 33 fixed on one of attachments 30 (30-1, 30-2, . . . , 30-N) is changed to another of the communication tags 33, when the one piece of attachment information linked to one of the tag identifiers obtained through one beacon signal received by the vehicle receiver 24, does not match with another piece of attachment information linked to the one of tag identifiers stored in the vehicle storage 23 as one of the plurality of pieces of combined information, control the vehicle storage 23 to store a new piece of combined information containing the one of the tag identifiers and the one piece of attachment information linked thereto, in the beacon signals, and perform the predetermined operation based on the one piece of attachment information of the new piece of combined information.

(Item 21) The attachment management system 100 recited in Item 20, wherein the vehicle controller 21 is configured or programmed to determine that the one of the plurality of attachments 30 (30-1, 30-2, . . . , 30-N) is selected, when the vehicle receiver 24 receives the beacon signal from one of the plurality of communication tags 33 fixed on the one of the plurality of attachments 30 (30-1, 30-2, . . . , 30-N), of which a Received Signal Strength Indicator is a highest among the plurality of communication tags 33 fixed on the plurality of the attachment 30 arranged around the work vehicle 1. According to the attachment management system 100 recited in Item 21, the vehicle controller 21 can determine that the one of the plurality of attachments 30 (30-1, 30-2, . . . , 30-N) is selected, when the vehicle receiver 24 receives the beacon signal from one of the plurality of communication tags 33 fixed on the one of the plurality of attachments 30 (30-1, 30-2, . . . , 30-N), of which RSSI is the highest among the others.

(Item 22) The attachment management system 100 recited in Item 20 or 21, further including a user interface UI, wherein the vehicle controller 21 is configured or programmed to provide and sort on the user interface UI, the plurality of pieces of attachment information, based on Received Signal Strength Indicators of the beacon signals received by the vehicle receiver 24 from the plurality of communication tags 33 fixed on the plurality of attachments 30 (30-1, 30-2, . . . , 30-N) arranged around the work vehicle 1, provide on the user interface UI, a fourth prompt (Prompt 4) inquiring about which one of the plurality of pieces of attachment information is to be selected, and determine that the one of the plurality of attachments 30 (30-1, 30-2, . . . , 30-N) is selected by an operator to the fourth prompt through the user interface UI. According to the attachment management system 100 recited in Item 22, the vehicle controller 21 can provide and sort on the user interface UI, the plurality of pieces of attachment information, based on RSSIs of the beacon signals and a fourth prompt inquiring about which one of the plurality of pieces of attachment information is to be selected.

(Item 23) The attachment management system 100 recited in any one of Items 20 to 22, further including a notifier 28 to provide notification, wherein the vehicle controller 21 is configured or programmed to control the notifier 28 to provide an alarm before controlling the vehicle storage 23 to store the new piece of combined information. According to the attachment management system 100 recited in Item 23, the vehicle controller 21 can control the notifier 28 to provide an alarm before controlling the vehicle storage 23 to store the new piece of combined information.

(Item 24) The attachment management system 100 recited in any one of Items 20 to 24, further including a user interface UI, wherein the vehicle controller 21 is configured or programmed to, provide on the user interface UI, a first prompt (Prompt 1) inquiring about whether to store in the vehicle storage 23, the tag identifier and attachment information linked thereto in one of the beacon signals received from one of the plurality of communication tags 33, as the new piece of combined information, before controlling the vehicle storage 23 to store the new piece of combined information, and control the vehicle storage 23 to store the tag identifier and attachment information linked thereto in the one of the beacon signals received from the one of the plurality of communication tags 33, as the new piece of combined information, after receiving approval of an operator to the first prompt. According to the attachment management system 100 recited in Item 24, the vehicle controller 21 can inquire the operator about whether to store in the vehicle storage 23, the tag identifier and attachment information linked thereto in one of the beacon signals, as the new piece of combined information, before controlling the vehicle storage 23 to store the new piece of combined information.

(Item 25) The attachment management system 100 recited in any one of Items 20 to 24, further including a user interface UI, wherein the vehicle controller 21 is configured or programmed to, when at least either one of the tag identifier and attachment information in the beacon signal which the vehicle receiver 24 is receiving from the tag transceiver 34, does not match with the tag identifier and attachment information stored in the vehicle storage 23 as the one of the plurality of pieces of combined information, provide on the user interface UI, the tag identifier and attachment information stored in the vehicle storage 23 as the one of the plurality of pieces of combined information, and a second prompt inquiring about whether to perform the predetermined operation based on the tag identifier and attachment information stored in the vehicle storage 23 as the one of the plurality of pieces of combined information, and perform the predetermined operation based on attachment information included in the one of the plurality of pieces of combined information, after receiving approval of an operator to the second prompt. According to the attachment management system 100 recited in Item 25, the vehicle controller 21 can provide to the operator, the tag identifier (tag ID) and attachment information in the beacon signal which the vehicle receiver 24 is receiving from the tag transceiver 34, and inquire about whether to perform the predetermined operation based on the tag identifier and attachment information stored in the vehicle storage 23, when either or both of the tag identifier (tag ID) and attachment information does not match with the tag identifier (tag ID) and attachment information stored in the vehicle storage 23 as the at least one piece of combined information.

(Item 26) The attachment management system 100 recited in any one of Items 20 to 25, wherein each of the tag transceivers 34 of the plurality of communication tags 33 is operable to periodically transmit the beacon signal at a predetermined period, the vehicle controller 21 is configured or programmed to perform the predetermined operation based on the one piece of attachment information stored in the vehicle storage 23 as the one of the plurality of pieces of combined information, when the vehicle receiver 24 does not receive the beacon signals from the tag transceivers 34 in a predetermined time interval exceeding the predetermined period. According to the attachment management system 100 recited in Item 26, the vehicle controller 21 can perform the predetermined operation based on the one piece of attachment information stored in the vehicle storage 23, when the vehicle receiver 24 does not receive the beacon signals in a predetermined time interval.

(Item 27) The attachment management system 100 recited in Item 26, wherein each of the plurality of pieces of attachment information includes unchangeable information which is not changeable over time and changeable information which is changeable over time, the vehicle controller 21 is configured or programmed, when the vehicle receiver 24 does not receive the beacon signals from the tag transceivers 34 in the predetermined time interval exceeding the predetermined period, while performing the predetermined operation based on the one piece of attachment information in the beacon signal received from the tag transceiver 34 of one of the plurality of communication tags 33, to maintain performing the predetermined operation based on unchangeable information of the one piece of attachment information stored in the vehicle storage 23 as the one of the plurality of pieces of combined information, and not to perform the predetermined operation based on changeable information of the one piece of attachment information stored in the vehicle storage 23 as the one of the plurality of pieces of combined information. According to the attachment management system 100 recited in Item 27, the vehicle controller 21 can maintain performing the predetermined operation depending on whether attachment information is unchangeable information or changeable information.

(Item 28) The attachment management system 100 recited in any one of Items 20 to 27, wherein the vehicle controller 21 is configured or programmed to maintain performing the predetermined operation based on the one piece of attachment information stored in the vehicle storage 23 as the one of the plurality of pieces of combined information, when the beacon signal is interrupted while the vehicle controller 21 performs the predetermined operation based on the one piece of attachment information. According to the attachment management system 100 recited in Item 28, the vehicle controller 21 can maintain performing the predetermined operation based on attachment information, when the beacon signal is interrupted while the vehicle controller 21 performs the predetermined operation based on attachment information.

(Item 29) The attachment management system 100 recited in any one of Items 20 to 28, further including a mobile terminal 40 including a terminal interface 42 and a terminal transceiver 44, wherein the mobile terminal 40 is configured or programmed to obtain the one piece of attachment information through the terminal interface 42, and transmit the one piece of attachment information, from the terminal transceiver 44 to the tag transceiver 34, to cause the tag memory 32 to store the one piece of attachment information. According to the attachment management system 100 recited in Item 29, the mobile terminal 40 can obtain attachment information through the terminal interface 42, and transmit attachment information from the terminal transceiver 44 to the tag transceiver 34, to cause the tag memory 32 to store attachment information.

(Item 30) The attachment management system 100 recited in Item 29, wherein the terminal interface 42 is configured or programmed to allow an operator to select the one piece of attachment information, and the one piece of attachment information selected by the operator is transmitted from the terminal transceiver 44 to the tag transceiver 34. According to the attachment management system 100 recited in Item 30, the operator can select the one piece of attachment information through the terminal interface 42, which can be transmitted from the terminal transceiver 44 to the tag transceiver 34.

(Item 31) The attachment management system 100 recited in Item 29 or 30, wherein the terminal interface 42 is configured or programmed to allow an operator to input the one piece of attachment information, and the one piece of attachment information input by the operator is transmitted from the terminal transceiver 44 to the tag transceiver 34. According to the attachment management system 100 recited in Item 31, the operator can input the one piece of attachment information through the terminal interface 42, which can be transmitted from the terminal transceiver 44 to the tag transceiver 34.

(Item 32) The attachment management system 100 recited in any one of Items 29 to 31, wherein the terminal interface 42 is configured or programmed to obtain the one of the tag identifiers of one of the communication tags 33, and transmit the one piece of attachment information obtained through the terminal interface 42, from the terminal transceiver 44 to one of the tag transceivers 34 corresponding to the one of the tag identifiers.

(Item 33) The attachment management system 100 recited in any one of Items 29 to 32, wherein the terminal interface 42 is configured or programmed to obtain the one of the tag identifiers of the one of the communication tags 33 in the one of the beacon signals received by the terminal transceiver 44 from the one of the tag transceivers 34, and transmit the one piece of attachment information obtained through the terminal interface 42 from the terminal transceiver 44 to the one of tag transceivers 34 corresponding to one of the tag identifiers. According to the attachment management system 100 recited in Item 33, the mobile terminal 40 can obtain the one of the tag identifiers of the one of the communication tags 33 and transmit the one piece of attachment information to the one of tag transceivers 34.

(Item 34) The attachment management system 100 recited in any one of Items 29 to 33, wherein the mobile terminal 40 includes a camera 46, the one of the communication tags 33 includes an image code recording the tag identifier of the one of the communication tags 33, and the mobile terminal 40 is configured or programmed to obtain one of the tag identifiers of the one of the communication tags 33, by scanning the image code with the camera 46, and transmit the one piece of attachment information obtained through the terminal interface 42 from the terminal transceiver 44 to the one of the tag transceivers 34 corresponding to the one of the tag identifiers. According to the attachment management system 100 recited in Item 34, the mobile terminal 40 can obtain the tag identifier (tag ID) of the communication tag 33, by scanning the image code with the camera 46, and transmit attachment information from the terminal transceiver 44 to the tag transceiver 34.

(Item 35) The attachment management system 100 recited in any one of Items 20 to 34, further including a mobile terminal 40 including a terminal interface 42 and a terminal transceiver 44, and a server 50 capable of communicating with the terminal communicator of the mobile terminal 40, wherein each of the plurality of pieces of attachment information includes an attachment identifier (attachment ID) unique to the attachment 30, to which one of the communication tags 33 is fixed, the mobile terminal 40 is configured or programmed to obtain the one piece of attachment information by communicating with the server 50, based on the one of the attachment identifiers (attachment IDs) input through the terminal interface 42, and transmit the one piece of attachment information from the terminal transceiver 44 to the tag transceiver 34 corresponding to the tag identifier, to cause the tag memory 32 to store the one piece of attachment information. According to the attachment management system 100 recited in Item 35, the mobile terminal 40 can obtain the one piece of attachment information by communicating with the server 50, based on the one of the attachment identifiers (attachment IDs) input through the terminal interface 42, and transmit the one piece of attachment information from the terminal transceiver 44 to the tag transceiver 34.

(Item 36) The attachment management system 100 recited in any one of Items 20 to 35, further including a mobile terminal 40 including a terminal interface 42 and a terminal transceiver 44, and a server 50 capable of communicating with the mobile terminal 40, wherein each of the plurality of pieces of attachment information includes an attachment identifier (attachment ID) unique to the attachment 30, to which one of the communication tags 33 is fixed, the mobile terminal 40 is configured or programmed to, when received the beacon signals from the plurality of communication tags 33, display on the terminal interface 42, the tag identifiers in the beacon signals received from the plurality of communication tags 33, allow an operator to select one of the tag identifiers in the beacon signals displayed on the terminal interface 42, and to input one of an attachment identifier (attachment ID) unique to the attachment corresponding to the selected one of the tag identifiers, through the terminal interface 42, obtain one of the plurality of pieces of attachment information from the server 50 by communicating with the server 50 based on the input one of the attachment identifiers (attachment IDs), and transmit the beacon signal containing obtained one of the plurality of pieces of attachment information, from the terminal transceiver 44 to the tag transceiver 34, to cause the tag memory 32 to store attachment information. According to the attachment management system 100 recited in Item 36, the mobile terminal 40 can display on the terminal interface 42, the tag identifiers in the beacon signals, which can be selected by the operator, and allow an operator to select one of the tag identifiers, and to input one of an attachment identifier (attachment ID), and obtain one of the plurality of pieces of attachment information from the server 50 by communicating with the server 50 based on the input one of the attachment identifiers (attachment IDs).

(Item 37) The attachment management system 100 recited in any one of Items 1 to 36, wherein the one piece of attachment information includes at least one of information indicating a name and specification of the one of the plurality of attachments 30 (30-1, 30-2, . . . , 30-N), information indicating a rated flowrate of hydraulic operation fluid from the work vehicle 1 to the one of the plurality of attachments 30 (30-1, 30-2, . . . , 30-N), information indicating an operating time of the one of the plurality of attachments 30 (30-1, 30-2, . . . , 30-N), and information indicating a state of capacity of one of the tag batteries that supplies power to the tag memory 32 and the tag transceiver 34 of the one of the plurality of beacon tags. According to the attachment management system 100 recited in Item 37, the one piece of attachment information may include various information.

(Item 38) The attachment management system 100 recited in any one of Items 4 to 37, wherein the user interface UI includes at least one of a vehicle interface 25 on the work vehicle 1, an input/output device 66 on an external terminal 60 capable of communicating with a vehicle communicator 27, and a terminal interface 42 on the mobile terminal 40 capable of communicating with the vehicle communicator 27. According to the attachment management system 100 recited in Item 38, the user interface UI may include the vehicle interface 25, an input/output device 66, and/or the terminal interface 42.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An attachment management system, comprising:
a work vehicle including a vehicle storage, a vehicle receiver, and a vehicle controller;
an attachment detachably coupled to the work vehicle; and
at least one communication tag interchangeably fixed to the attachment and including:
a tag transceiver to communicate with the vehicle receiver through a beacon signal that is compliant with a near field communication standard; and
a tag memory to store a tag identifier unique to the at least one communication tag and attachment information unique to the attachment, to which the at least one communication tag is fixed; wherein
the vehicle storage is operable to store at least one piece of combined information including the tag identifier and attachment information linked thereto, the at least one piece of combined information obtained through the beacon signal which the vehicle receiver has received from the tag transceiver of the at least one communication tag; and
the vehicle controller is configured or programmed to, either i) when one of the at least one communication tag that has been interchangeably fixed to the attachment is replaced with another one of the at least one communication tag, or ii) when the tag memory of the at least one communication tag is overwritten with attachment information unique to another attachment, such that at least either one of the tag identifier and attachment information in the beacon signal which the vehicle receiver is receiving from the tag transceiver, does not match with the tag identifier and attachment information stored in the vehicle storage as the at least one piece of combined information,
control the vehicle storage to store a new piece of combined information including the tag identifier and attachment information linked thereto in the beacon signal which the vehicle receiver is receiving from the tag transceiver; and
perform a predetermined operation based on attachment information of the new piece of combined information.

2. The attachment management system according to claim 1, further comprising:
a user interface to provide notification; wherein the vehicle controller is configured or programmed to control the user interface to provide an audible and/or visual alarm before controlling the vehicle storage to store the new piece of combined information.

3. The attachment management system according to claim 1, further comprising:
a user interface to provide notification; wherein the vehicle controller is configured or programmed to control the user interface to provide an audible and/or visual alarm before performing the predetermined operation based on attachment information of the new piece of combined information.

4. The attachment management system according to claim 1, further comprising:
a user interface; wherein
the vehicle controller is configured or programmed to:
provide on the user interface, a prompt inquiring about whether to store in the vehicle storage, the tag identifier and attachment information linked thereto in the beacon signal which the vehicle receiver is receiving from the tag transceiver, as the new piece of combined information, before controlling the vehicle storage to store the new piece of combined information; and
control the vehicle storage to store the tag identifier and attachment information linked thereto in the beacon signal, as the new piece of combined information, after receiving approval of an operator to the prompt.

5. The attachment management system according to claim 1, further comprising:
a user interface; wherein
the vehicle controller is configured or programmed to, when at least either one of the tag identifier and attachment information in the beacon signal which the vehicle receiver is receiving from the tag transceiver, does not match with the tag identifier and attachment information stored in the vehicle storage as the at least one piece of combined information;
provide on the user interface, the tag identifier and attachment information stored in the vehicle storage as the at least one piece of combined information, and a prompt inquiring about whether to perform the predetermined operation based on the tag identifier and attachment information stored in the vehicle storage as the at least one piece of combined information; and
perform the predetermined operation based on attachment information stored in the vehicle storage as the at least one piece of combined information, after receiving approval of an operator to the prompt.

6. The attachment management system according to claim 1, wherein

41 the tag transceiver is operable to periodically transmit the beacon signal at a predetermined period;

the vehicle controller is configured or programmed to perform the predetermined operation based on attachment information stored in the vehicle storage as the at least one piece of combined information, when the vehicle receiver does not receive the beacon signal from the tag transceiver in a predetermined time interval exceeding the predetermined period.

7. The attachment management system according to claim 6, wherein attachment information includes unchangeable information that is not changeable over time, and changeable information that is changeable over time;

the vehicle controller is configured or programmed, when the vehicle receiver does not receive the beacon signal from the tag transceiver in the predetermined time interval exceeding the predetermined period, while performing the predetermined operation based on attachment information in the beacon signal received from the tag transceiver;

to maintain performing the predetermined operation based on unchangeable information of attachment information stored in the vehicle storage as the at least one piece of combined information; and not to perform the predetermined operation based on changeable information of attachment information stored in the vehicle storage as the at least one piece of combined information.

8. The attachment management system according to claim 1, wherein the vehicle controller is configured or programmed to maintain performing the predetermined operation based on attachment information stored in the vehicle storage as the at least one piece of combined information, when the beacon signal is interrupted while the vehicle controller performs the predetermined operation based on attachment information.

9. The attachment management system according to claim 1, further comprising:

a user interface; wherein the at least one communication tag includes a plurality of communication tags;

the vehicle storage is operable to store a plurality of pieces of combined information each including the tag identifiers and a plurality of pieces of attachment information linked to one of the tag identifiers in the beacon signals which the vehicle receiver has received from the tag transceivers of the plurality of communication tags; and the vehicle controller is configured or programmed to, when the vehicle receiver does not receive the beacon signals from the tag transceivers of the plurality of communication tags:

provide on the user interface, a prompt inquiring about which one of the plurality of pieces of attachment information stored in the vehicle storage as the plurality of pieces of combined information is to be selected; and perform the predetermined operation based on the one of the plurality of pieces of attachment information selected by an operator to the prompt.

10. The attachment management system according to claim 1, further comprising:

a mobile terminal including a terminal interface and a terminal transceiver; wherein

42 the mobile terminal is configured or programmed to obtain attachment information through the terminal interface, and transmit attachment information from the terminal transceiver to the tag transceiver, to cause the tag memory to store attachment information.

11. The attachment management system according to claim 10, wherein the terminal interface is configured or programmed to allow an operator to select attachment information, and transmit attachment information selected by the operator, from the terminal transceiver to the tag transceiver.

12. The attachment management system according to claim 10, wherein the terminal interface is configured or programmed to allow an operator to input attachment information, and transmit attachment information input by the operator, from the terminal transceiver to the tag transceiver.

13. The attachment management system according to claim 10, wherein the terminal interface is configured or programmed to obtain the tag identifier of the at least one communication tag, and transmit attachment information obtained through the terminal interface, from the terminal transceiver to the tag transceiver corresponding to the tag identifier.

14. The attachment management system according to claim 13, wherein the terminal interface is configured or programmed to obtain the tag identifier of the at least one communication tag in the beacon signal received by the terminal transceiver from the tag transceiver, and transmit attachment information obtained through the terminal interface, from the terminal transceiver to the tag transceiver corresponding to the tag identifier.

15. The attachment management system according to claim 13, wherein the mobile terminal includes a camera;

the at least one communication tag includes an image code recording the tag identifier of the at least one communication tag; and the mobile terminal is configured or programmed to obtain the tag identifier of the at least one communication tag, by scanning the image code with the camera, and transmit attachment information obtained through the terminal interface, from the terminal transceiver to the tag transceiver corresponding to the tag identifier.

16. The attachment management system according to claim 1, further comprising:

a mobile terminal including a terminal interface and a terminal transceiver; and a server capable of communicating with the terminal communicator of the mobile terminal; wherein the mobile terminal is configured or programmed to:

obtain attachment information by communicating with the server, based on an attachment identifier unique to the attachment, which is input or selected through the terminal interface;

obtain attachment information by communicating with the server, based on the attachment identifier input through the terminal interface; and transmit obtained attachment information from the terminal transceiver to the tag transceiver corresponding to the tag identifier, to cause the tag memory to store attachment information.

17. The attachment management system according to claim 1, further comprising:

a mobile terminal including a terminal interface and a terminal transceiver; and a server capable of communicating with the mobile terminal; wherein the at least one communication tag includes a plurality of communication tags;

the mobile terminal is configured or programmed to, when received the beacon signals from the plurality of communication tags:

display on the terminal interface, the tag identifiers in the beacon signals received from the plurality of communication tags;

allow an operator to select one of the tag identifiers in the beacon signals displayed on the terminal interface, and to input an attachment identifier unique to the attachment through the terminal interface;

obtain attachment information from the server by communicating with the server based on the attachment identifier selected by the operator; and transmit the beacon signal containing attachment information, from the terminal transceiver to the tag transceiver, to cause the tag memory to store attachment information.

18. The attachment management system according to claim 1, wherein the vehicle controller is configured or programmed to perform the predetermined operation based on attachment information stored in the vehicle storage as the at least one piece of combined information, when attachment information corresponding to the tag identifier in the beacon signal matches with attachment information corresponding to the tag identifier stored in the vehicle storage as the at least one piece of combined information.

19. The attachment management system according to claim 1, wherein the vehicle controller is configured or programmed to, when attachment information corresponding to the tag identifier included in the beacon signal does not match with attachment information corresponding to the tag identifier stored in the vehicle storage as the at least one piece of combined information;

store a new piece of combined information containing the tag identifier and attachment information linked thereto in the beacon signal which the vehicle receiver is receiving from the tag transceiver; and perform a predetermined operation based on attachment information of the new piece of combined information.

20. The attachment management system according to claim 1, wherein the one piece of attachment information includes at least one of information indicating a name and specification of the one of the plurality of attachments, information indicating a rated flowrate of hydraulic operation fluid from the work vehicle to the one of the plurality of attachments, information indicating an operating time of the one of the plurality of attachments, or information indicating a state of capacity of one of the tag batteries that supplies power to the tag memory and the tag transceiver of the one of the plurality of beacon tags.

21. The attachment management system according to claim 4, wherein the user interface includes at least one of a vehicle interface on the work vehicle, an input/output device on an external terminal capable of communicating with a vehicle communicator, and a terminal interface on the mobile terminal capable of communicating with the vehicle communicator.

22. An attachment management system, comprising:

a work vehicle including a vehicle storage, a vehicle receiver, and a vehicle controller;

a plurality of attachments each detachably coupled to the work vehicle; and a plurality of communication tags, each of which is interchangeably fixed to one of the plurality of attachments, and includes:

a tag transceiver to communicate with the vehicle receiver through a beacon signal that is compliant with a near field communication standard; and a tag memory to store a piece of combined information including a tag identifier unique to one of the plurality of communication tags and attachment information unique to one of the plurality of attachments, to which the one of the plurality of communication tags is fixed; wherein the vehicle storage is operable to store a plurality of pieces of combined information, each of which includes one of the tag identifiers and one piece of attachment information linked thereto, the plurality of pieces of combined information obtained through the beacon signals which the vehicle receiver has received from the tag transceivers of the plurality of communication tags; and the vehicle controller is configured or programmed to, at a timing when or after one of the plurality of attachments is selected:

determine either i) that one of the plurality of communication tags that has been interchangeably fixed to the selected one of the plurality of attachments is replaced with another one of the plurality of communication tags, or ii) that the tag memory of one of the plurality of communication tags is overwritten with another piece of attachment information other than the one piece of attachment information unique to the selected one of the plurality of attachments, when the one piece of attachment information linked to one of the tag identifiers, which are obtained through one of the beacon signals received by the vehicle receiver, does not match with the one piece of attachment information linked to the one of the tag identifiers stored in the vehicle storage as one of the plurality of pieces of combined information, control the vehicle storage to store a new piece of combined information containing the one of the tag identifiers and the one piece of attachment information linked thereto, in one of the beacon signals which the vehicle receiver is receiving from one of the tag transceivers of the plurality of communication tags, and perform a predetermined operation based on the one piece of attachment information of the new piece of combined information.

23. The attachment management system according to claim 22, wherein the vehicle controller is configured or programmed to determine that the one of the plurality of attachments is selected, when the vehicle receiver receives the beacon signal from one of the plurality of communication tags fixed on the one of the plurality of attachments, of which a Received Signal Strength Indicator is highest among the plurality of communication tags fixed on the plurality of the attachment arranged around the work vehicle.

24. The attachment management system according to claim 22, further comprising:
    a user interface; wherein
    the vehicle controller is configured or programmed to:
        provide and sort on the user interface, the plurality of pieces of attachment information, based on Received Signal Strength Indicators of the beacon signals received by the vehicle receiver from the plurality of communication tags fixed on the plurality of attachments arranged around the work vehicle;
        provide on the user interface, a-fourth prompt inquiring about which one of the plurality of pieces of attachment information is to be selected; and
        determine that the one of the plurality of attachments is selected by an operator to the fourth prompt through the user interface.

25. The attachment management system according to claim 22, further comprising:
    a user interface to provide notification; wherein
    the vehicle controller is configured or programmed to control the user interface to provide an audible and/or visual alarm before controlling the vehicle storage to store the new piece of combined information.

26. The attachment management system according to claim 22, further comprising:
    a user interface; wherein
    the vehicle controller is configured or programmed to:
        provide on the user interface, a prompt inquiring about whether to store in the vehicle storage, the tag identifier and attachment information linked thereto in one of the beacon signals received from one of the plurality of communication tags, as the new piece of combined information, before controlling the vehicle storage to store the new piece of combined information; and
        control the vehicle storage to store the tag identifier and attachment information linked thereto in the one of the beacon signals received from the one of the plurality of communication tags, as the new piece of combined information, after receiving approval of an operator to the prompt.

27. The attachment management system according to claim 22, further comprising:
    a user interface; wherein
    the vehicle controller is configured or programmed to, when at least either one of the tag identifier and attachment information in the beacon signal which the vehicle receiver is receiving from the tag transceiver, does not match with the tag identifier and attachment information stored in the vehicle storage as the one of the plurality of pieces of combined information;
        provide on the user interface, the tag identifier and attachment information stored in the vehicle storage as the one of the plurality of pieces of combined information, and a prompt inquiring about whether to perform the predetermined operation based on the tag identifier and attachment information stored in the vehicle storage as the one of the plurality of pieces of combined information; and
        perform the predetermined operation based on attachment information included in the one of the plurality of pieces of combined information, after receiving approval of an operator to the prompt.

28. The attachment management system according to claim 22, wherein
    each of the tag transceivers of the plurality of communication tags is operable to periodically transmit the beacon signal at a predetermined period;
    the vehicle controller is configured or programmed to perform the predetermined operation based on the one piece of attachment information stored in the vehicle storage as the one of the plurality of pieces of combined information, when the vehicle receiver does not receive the beacon signals from the tag transceivers in a predetermined time interval exceeding the predetermined period.

29. The attachment management system according to claim 28, wherein
    each of the plurality of pieces of attachment information includes unchangeable information which is not changeable over time and changeable information which is changeable over time;
    the vehicle controller is configured or programmed, when the vehicle receiver does not receive the beacon signals from the tag transceivers in the predetermined time interval exceeding the predetermined period, while performing the predetermined operation based on the one piece of attachment information in the beacon signal received from the tag transceiver of one of the plurality of communication tags:
        to maintain performing the predetermined operation based on unchangeable information of the one piece of attachment information stored in the vehicle storage as the one of the plurality of pieces of combined information; and
        not to perform the predetermined operation based on changeable information of the one piece of attachment information stored in the vehicle storage as the one of the plurality of pieces of combined information.

30. The attachment management system according to claim 22, wherein
    the vehicle controller is configured or programmed to maintain performing the predetermined operation based on the one piece of attachment information stored in the vehicle storage as the one of the plurality of pieces of combined information, when the beacon signal is interrupted while the vehicle controller performs the predetermined operation based on the one piece of attachment information.

31. The attachment management system according to claim 22, further comprising:
    a mobile terminal including a terminal interface and a terminal transceiver; wherein
    the mobile terminal is configured or programmed to obtain the one piece of attachment information through the terminal interface, and transmit the one piece of attachment information, from the terminal transceiver to the tag transceiver, to cause the tag memory to store the one piece of attachment information.

32. The attachment management system according to claim 31, wherein
    the terminal interface is configured or programmed to allow an operator to select the one piece of attachment information; and
    the one piece of attachment information selected by the operator is transmitted from the terminal transceiver to the tag transceiver.

33. The attachment management system according to claim 31, wherein the terminal interface is configured or programmed to allow an operator to input the one piece of attachment information; and the one piece of attachment information input by the operator is transmitted from the terminal transceiver to the tag transceiver.

34. The attachment management system according to claim 31, wherein the terminal interface is configured or programmed to obtain the one of the tag identifiers of one of the communication tags, and transmit the one piece of attachment information obtained through the terminal interface, from the terminal transceiver to one of the tag transceivers corresponding to the one of the tag identifiers.

35. The attachment management system according to claim 34, wherein the terminal interface is configured or programmed to obtain the one of the tag identifiers of the one of the communication tags in the one of the beacon signals received by the terminal transceiver from the one of the tag transceivers, and transmit the one piece of attachment information obtained through the terminal interface from the terminal transceiver to the one of tag transceivers corresponding to one of the tag identifiers.

36. The attachment management system according to claim 34, wherein the mobile terminal includes a camera;

the one of the communication tags includes an image code recording the tag identifier of the one of the communication tags; and the mobile terminal is configured or programmed to obtain one of the tag identifiers of the one of the communication tags, by scanning the image code with the camera, and transmit the one piece of attachment information obtained through the terminal interface from the terminal transceiver to the one of the tag transceivers corresponding to the one of the tag identifiers.

37. The attachment management system according to claim 22, further comprising:

a mobile terminal including a terminal interface and a terminal transceiver; and a server capable of communicating with the terminal communicator of the mobile terminal; wherein each of the plurality of pieces of attachment information includes an attachment identifier unique to the attachment, to which one of the communication tags is fixed;

the mobile terminal is configured or programmed to:

obtain the one piece of attachment information by communicating with the server, based on the one of the attachment identifiers input through the terminal interface; and transmit the one piece of attachment information from the terminal transceiver to the tag transceiver corresponding to the tag identifier, to cause the tag memory to store the one piece of attachment information.

38. The attachment management system according to claim 22, further comprising:

a mobile terminal including a terminal interface and a terminal transceiver; and a server capable of communicating with the mobile terminal; wherein each of the plurality of pieces of attachment information includes an attachment identifier unique to the attachment, to which one of the communication tags is fixed;

the mobile terminal is configured or programmed to, when received the beacon signals from the plurality of communication tags:

display on the terminal interface, the tag identifiers in the beacon signals received from the plurality of communication tags;

allow an operator to select one of the tag identifiers in the beacon signals displayed on the terminal interface, and to input one of an attachment identifier unique to the attachment corresponding to the selected one of the tag identifiers, through the terminal interface;

obtain one of the plurality of pieces of attachment information from the server by communicating with the server based on the input one of the attachment identifiers; and transmit the beacon signal containing obtained one of the plurality of pieces of attachment information, from the terminal transceiver to the tag transceiver, to cause the tag memory to store attachment information.

39. An attachment management system, comprising:

a work vehicle including a vehicle storage, a vehicle receiver, and a vehicle controller;

an attachment detachably coupled to the work vehicle containing a communication tag which includes:

a tag transceiver to communicate with the vehicle receiver through a beacon signal that is compliant with a near field communication standard, and a tag memory to store a tag identifier unique to the communication tag and attachment information unique to the attachment; wherein the vehicle storage stores at least one piece of combined information including the tag identifier and attachment information linked thereto, the at least one piece of combined information obtained through the beacon signal which the vehicle receiver has received from the tag transceiver of the communication tag, and the vehicle controller is configured or programmed to, when the tag memory of the communication tag is overwritten with attachment information unique to another attachment, such that at least either one of the tag identifier and attachment information in the beacon signal which the vehicle receiver is receiving from the tag transceiver, does not match with the tag identifier and attachment information stored in the vehicle storage as the at least one piece of combined information, control the vehicle storage to store a new piece of combined information including the tag identifier and attachment information linked thereto in the beacon signal which the vehicle receiver is receiving from the tag transceiver, and perform a predetermined operation based on attachment information of the new piece of combined information.

40. An attachment management system, comprising:

a work vehicle including a vehicle storage, a vehicle receiver, and a vehicle controller;

a plurality of attachments each detachably coupled to the work vehicle and containing a communication tag which includes:

a tag transceiver to communicate with the vehicle receiver through a beacon signal that is compliant with a near field communication standard; and a tag memory to store a piece of combined information including a tag identifier unique to the communication tag and attachment information unique to one of the plurality of attachments; wherein the vehicle storage is operable to store a plurality of pieces of combined information, each of which includes the tag identifier of the tag memory of one of the plurality of attachments and one piece of attachment information linked thereto, the plurality of pieces of combined information obtained through the beacon signals which the vehicle receiver has received from the tag transceiver of the plurality of attachments; and the vehicle controller is configured or programmed to, at a timing when or after one of the plurality of attachments is selected:

determine that the tag memory of the communication tag of the one of the plurality of attachments is overwritten with another piece of attachment information other than the one piece of attachment information unique to the selected one of the plurality of attachments, when the one piece of attachment information linked to one of the tag identifier of the tag memory of one of the plurality of attachments, which are obtained through one of the beacon signals received by the vehicle receiver, does not match with the one piece of attachment information linked to the tag identifier of the one of the plurality of attachments stored in the vehicle storage as one of the plurality of pieces of combined information, control the vehicle storage to store a new piece of combined information containing the tag identifier of the selected one of the plurality of attachments and the one piece of attachment information linked thereto, in one of the beacon signals which the vehicle receiver is receiving from the tag transceiver of one of the plurality of attachments, and perform a predetermined operation based on the one piece of attachment information of the new piece of combined information.

\* \* \* \* \*